(12) United States Patent
Bharadwaj et al.

(10) Patent No.: US 10,148,326 B2
(45) Date of Patent: Dec. 4, 2018

(54) METHODS AND APPARATUS FOR EXTENDED RECEIVER PROCESSING TIME

(71) Applicant: QUALCOMM Incorporated, San Diego, CA (US)

(72) Inventors: Arjun Bharadwaj, Poway, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 15/194,348

(22) Filed: Jun. 27, 2016

(65) Prior Publication Data
US 2017/0012683 A1    Jan. 12, 2017

Related U.S. Application Data

(60) Provisional application No. 62/189,170, filed on Jul. 6, 2015.

(51) Int. Cl.
| | |
|---|---|
| H04B 7/04 | (2017.01) |
| H04W 52/02 | (2009.01) |
| H03M 13/00 | (2006.01) |
| H04B 7/0452 | (2017.01) |
| H04L 5/00 | (2006.01) |
| H04L 1/00 | (2006.01) |

(52) U.S. Cl.
CPC ......... H04B 7/0452 (2013.01); H04L 1/0045 (2013.01); H04L 1/0057 (2013.01); H04L 5/0007 (2013.01)

(58) Field of Classification Search
CPC ... H04B 7/0452; H04L 1/0057; H04L 1/0045; H04L 5/0007
See application file for complete search history.

(56) References Cited

U.S. PATENT DOCUMENTS

2010/0199142 A1*  8/2010  Greferath .............. H03M 13/00
                                                                714/752
2016/0374017 A1* 12/2016  Stacey .............. H04W 52/0216

FOREIGN PATENT DOCUMENTS

JP        2008270863 A      11/2008

OTHER PUBLICATIONS

IEEE, Piscataway, Nj , USA, 1-25 Jul. 1, 2008 (Jul. 1, 2008) , XP040429866.

(Continued)

*Primary Examiner* — Kiet Tang
(74) *Attorney, Agent, or Firm* — Steven R. Thiel; Knobbe, Martens, Olson & Bear

(57) ABSTRACT

Methods and apparatus for single and multi-user signal extensions or padding are provided. In various aspects, a number of symbols required to transmit a plurality of data bits to each of a plurality of wireless communication devices and a fraction of useful bits in a final symbol of each of the plurality of data bits is determined. A signaling extension length may also be determined based at least in part on the fraction of useful bits and a modulation and coding scheme (MCS) of each of the plurality of wireless communication devices. A plurality of data packets for each of the plurality of wireless communication devices are generated, with each data packet comprising the corresponding data bits and the signaling extension after the final symbol of each of the plurality of data packets.

21 Claims, 15 Drawing Sheets

(56) References Cited

OTHER PUBLICATIONS

International Search Report and Written Opinion—PCT/US2016/039819—ISA/EPO—dated Oct. 21, 2016.
Zhang H., "HE PHY Padding and Packet Extension; 11-15-0810-01-00ax-he-phy-padding-and-packet-extension," IEEE Draft; 11-15-0810-01-00AX-HE-PHY-Padding-and-Packet-Extension, IEEE-SA Mentor, Piscataway, NJ USA, vol. 802.11ax, No. 1, Sep. 14, 2015 (Sep. 14, 2015), pp. 1-46, XP068098035.

* cited by examiner

METHODS AND APPARATUS FOR EXTENDED RECEIVER PROCESSING TIME

CROSS REFERENCE TO RELATED APPLICATIONS

This application claims priority to U.S. Provisional Patent Application No. 62/189,170, filed Jul. 6, 2015, and entitled "METHODS AND APPARATUS FOR DETERMINING SINGLE AND MULTI-USER PADDING AND SIGNAL EXTENSION." The content of this prior application is considered part of this application, and is hereby incorporated by reference in its entirety.

BACKGROUND

Field

Certain aspects of the present disclosure generally relate to wireless communications, and more particularly, to methods and apparatus for single and multi-user signal extensions or padding.

Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

In order to address the issue of increasing bandwidth requirements that are demanded for wireless communications systems, different schemes are being developed to allow multiple user terminals to communicate with a single access point by sharing the channel resources while achieving high data throughputs. However, with an increased amount of data transmitted to a user terminal, additional processing time may be necessary for the user terminal to adequately process the data it receives. Thus, there is a need for an improved protocol for single and multi-user signal extensions or padding.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method of communicating in a wireless communication network. The method comprises determining, for each of a plurality of wireless communication devices, a number of symbols required to transmit a plurality of data packets to each of the plurality of wireless communication devices respectively. The method further includes determining, for each of the plurality of wireless communication devices, a fraction of useful bits in a final symbol of each of the plurality of data packets. The method further includes determining, for each of the plurality of wireless communication devices, a signaling extension length, based at least in part on the fraction of useful bits and a modulation and coding scheme (MCS) capability of each of the plurality of wireless communication devices. The method further includes generating the plurality of data packets for each of the plurality of wireless communication devices respectively, each data packet comprising data bits for a respective wireless communication device and an extension of a length equal to the signaling extension after the final symbol of each of the plurality of data packets. The method further includes transmitting the plurality data packets to each of the plurality of wireless communication devices respectively. In one embodiment, the signaling extension length is one of 0 µs, 4 µs, 8 µs, 12 µs or 16 µs. In some aspects, a processing extension provided to a receiver may be 0, 8, or 16 µs. This may be the total extra amount of time provided to a STA for responding to a message. In some aspects, the signal extension (SE) is 0, 4, 8, 12, or 16 µs. This is an amount of time added at the end of the last symbol in a packet. The processing extension (PE) may be a sum of the SE and additional time afforded to the STA due to hot having to process post-FEC padding bits included in the packet.

In some aspects, the method can further include determining a maximum number of symbols and a maximum fraction of useful bits among the plurality of wireless communication devices, wherein generating the plurality of data packets further comprises generating the plurality of data packets to include padding bits after the data bits for the respective wireless communication device and until a bit indicated by the maximum fraction of useful bits in the maximum number of symbols, based at least in part upon a length of the data bits for the respective wireless communication device. In various embodiments, the method can further include determining whether any one of the plurality of wireless communication devices requires an additional short symbol, based at least in part on an encoding method of the plurality of data packets and altering one or more of the fraction of useful bits or the number of symbols required if any one of the plurality of wireless communication devices requires the additional short symbol. In various aspects, the method can further include transmitting, in each of the plurality of data packets, an indication of the fraction of useful bits, a signaling extension disambiguation indication, and an indication of whether any one of the plurality of wireless communication devices requires the additional short symbol.

In other aspects, the method can further comprise determining, for each of a plurality of wireless communication devices, whether the signaling extension length for the respective wireless communication device is larger than the signaling extension length for the other plurality of wireless communication devices, determining whether the number of symbols required to transmit the data packet for the respective wireless communication device is less than a maximum number of symbols required to transmit the plurality of data packets for any one of the plurality of wireless communication devices, and determining whether the fraction of useful bits for the respective wireless communication device is less than one hundred percent. In accordance with these aspects, the method may further comprise decrementing the number of symbols required for the respective wireless communication device by one and setting the fraction of useful bits for the respective wireless communication device to one hundred percent if any one of the plurality of wireless communication devices requires an additional short symbol, and otherwise setting the fraction of useful bits for the respective wireless communication device to less than one hundred percent.

Another aspect of the disclosure provides another method of communicating in a wireless communication network. In accordance with this aspect, the method comprises receiving, by a wireless communication device, a data packet comprising an indication of a fraction of useful bits, an indication of whether an additional short symbol is contained in the data packet, data bits, and a signaling extension after a final symbol of the data packet. The method further comprises processing the data packet, based at least in part on the fraction of useful bits and the indication of whether the additional short symbol is contained in the data packet. In some aspects, the method may further comprise receiving, by the wireless communication device, a packet length indication and a signaling extension disambiguation indication in the data packet, and determining a number of symbols over which the data packet is transmitted based at least in part on the packet length indication and the signaling extension disambiguation indication.

Another aspect disclosed is a method for extending a message in a wireless communication network. In some aspects, the method includes determining a modulation and coding scheme capability of a destination device of the first message, determining a number of bits in a final symbol of the first message, determining a length of an extension based on the modulation and coding scheme capability and the number of bits; and transmitting the first message with an extension of the determined length to the destination device. In some aspects, the method includes transmitting a second message with a second extension of a different length to a second destination device simultaneously with the transmission of the first message. In some aspects, the extension length is one of 0 µs, 4 µs, 8 µs, 12 µs or 16 µs. In some aspects, the method also includes padding the first message and the second message based on a maximum number of bits in final symbols of the first and second messages.

In some aspects, the method includes determining a difference between a duration of the final symbol and the extension length, and indicating a processing extension disambiguation indication in the first message based on the difference. In some aspects, the method includes determining whether the first message is encoded using low density parity check (LDPC); and adding a symbol to the first message in response to the first message being encoded using low density parity check.

Another aspect disclosed is a method for receiving a first message including an extension in a wireless communication network. The method includes receiving, by a wireless communication device, a data packet comprising a first indication of a number of bits in a final symbol of the packet, a second indication of whether an additional symbol is contained in the data packet, and a signaling extension after the final symbol of the data packet; and processing the data packet, based at least in part on the fraction of bits and the second indication of whether the additional symbol is contained in the data packet. Some aspects receive, by the wireless communication device, a packet length indication and a signaling extension disambiguation indication in the data packet, determine a number of symbols over which the data packet is transmitted based at least in part on the packet length indication and the signaling extension disambiguation indication; and process the packet based on the number of symbols.

Another aspect disclosed is an apparatus for extending a first message in a wireless communication network. The apparatus includes an electronic hardware processor configured to determine a modulation and coding scheme capability of a destination device of the message, determine a number of bits in a final symbol of the message, determine a length of an extension based on the modulation and coding scheme capability and the number of bits; and a transmitter configure to transmit the first message with an extension of the determined length to the destination device. In some aspects, the electronic hardware processor is further configured to transmit a second message with a second extension of a different length to a second destination device simultaneously with the transmission of the first message. In some aspects, the extension length is one of 0 µs, 4 µs, 8 µs, 12 µs or 16 µs. In some aspects, the electronic hardware processor is further configured to pad the first message and the second message based on a maximum number of bits in final symbols of the first and second messages. In some aspects, the electronic hardware processor is further configured to determine a difference between a duration of the final symbol and the extension length, and indicate a processing extension disambiguation indication in the first message based on the difference. In some aspects, the electronic hardware processor is further configured to determine whether the first message is encoded using low density parity check (LDPC), and add a symbol to the first message in response to the first message being encoded using low density parity check.

Another aspect disclosed is an apparatus for receiving a first message including an extension in a wireless communication network. The apparatus includes a receiver configured to receive a data packet comprising a first indication of a number of bits in a final symbol of the packet, a second indication of whether an additional symbol is contained in the data packet, and a signaling extension after the final symbol of the data packet; and an electronic hardware processor configured to process the data packet, based at least in part on the fraction of bits and the second indication of whether the additional symbol is contained in the data packet. In some aspects, the receiver is further configured to receive a packet length indication and a signaling extension disambiguation indication in the data packet, and wherein the electronic hardware processor is further configured to: determine a number of symbols over which the data packet is transmitted based at least in part on the packet length indication and the signaling extension disambiguation indication, and process the packet based on the number of symbols.

DETAILED DESCRIPTION

Figure 1:
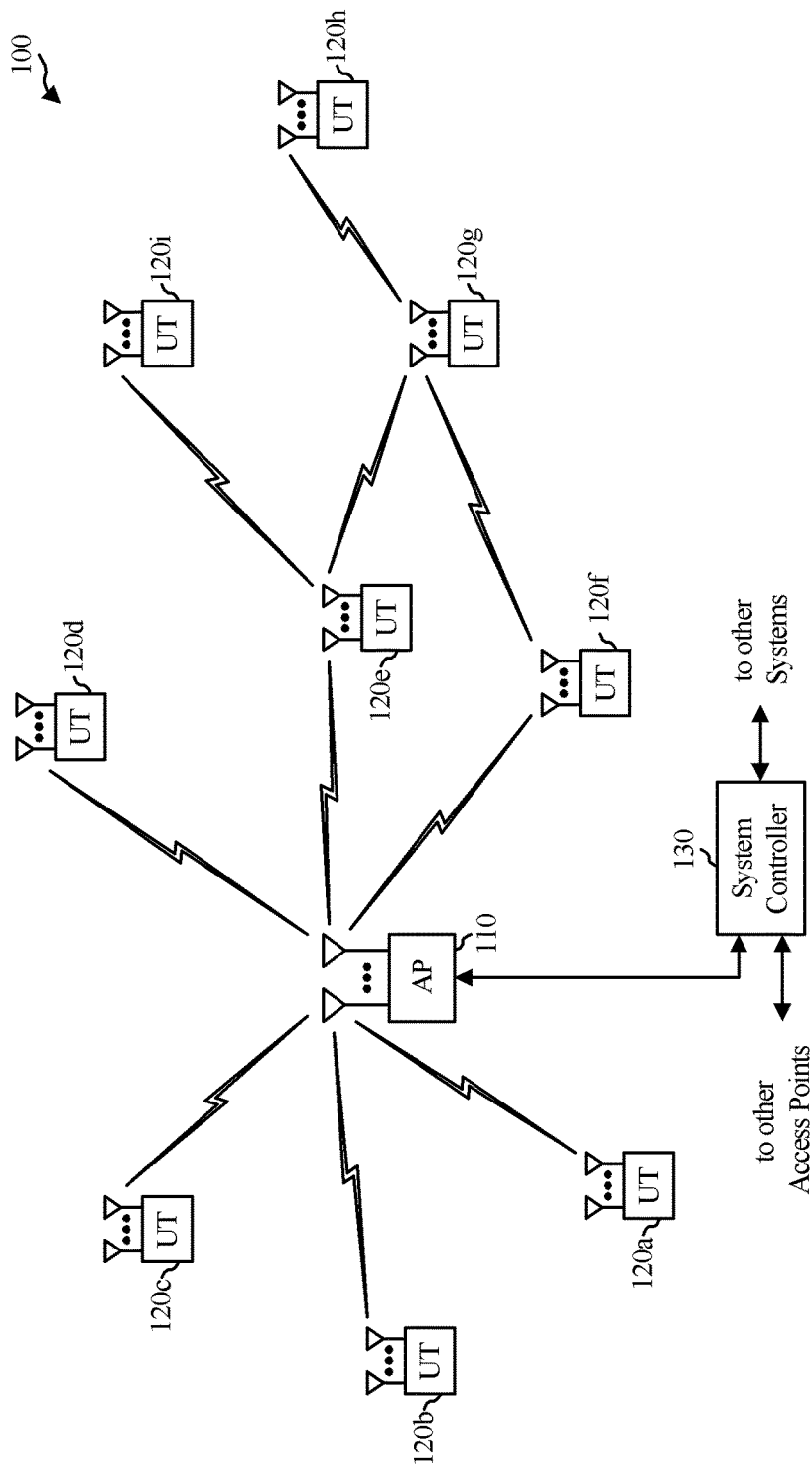
FIG. 1 illustrates a multiple-access multiple-input multiple-output (MIMO) system with access points and user terminals.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of a wireless local area network (WLAN). A WLAN may be used to interconnect nearby devices together, employing widely used networking protocols. The various aspects described herein may apply to any communication standard, such as Wi-Fi or, more generally, any member of the Institute of Electrical and Electronics Engineers (IEEE) 802.11 family of wireless protocols.

In some aspects, wireless signals may be transmitted according to a high-efficiency 802.11 protocol using orthogonal frequency-division multiplexing (OFDM), direct sequence spread spectrum (DSSS) communications, MIMO, some combination thereof, or other schemes. Implementations of the high-efficiency 802.11 protocol may be used for Internet access, sensors, metering, smart grid networks, or other wireless applications. Advantageously, aspects of certain devices implementing this particular wireless protocol may consume less power than devices implementing other wireless protocols, may be used to transmit wireless signals across short distances, and/or may be able to transmit signals less likely to be blocked by objects, such as humans.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA may also be used as an AP.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to concurrently transmit data belonging to multiple user terminals. A TDMA system may allow multiple user terminals to share the same frequency channel by dividing the transmission signal into different time slots, each time slot being assigned to different user terminal. A TDMA system may implement Global System for Mobile (GSM) or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement the IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RB S"), or some other terminology.

A station ("STA") may also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 is a diagram that illustrates a multiple-access multiple-input multiple-output (MIMO) system 100 with access points and user terminals. For simplicity, only one access point 110 is shown in FIG. 1. An access point is generally a fixed station that communicates with the user terminals, and a user terminal or STA may be fixed or mobile, and may be referred to herein as simply a wireless communication device. The access point 110 may communicate with one or more wireless communication device 120 (illustrated as UTs 120a-i) at any given moment on the downlink and uplink. The downlink (i.e., forward link) is the communication link from the access point 110 to the wireless communication devices 120, and the uplink (i.e., reverse link) is the communication link from the wireless communication devices 120 to the access point 110. A wireless communication device 120 may also communicate peer-to-peer with another wireless communication device 120. A system controller 130 couples to and provides coordination and control for the access points 110.

While portions of the following disclosure will describe wireless communication device 120 capable of communicating via Spatial Division Multiple Access (SDMA), for certain aspects, the wireless communication devices 120 may also include some wireless communication devices 120 that do not support SDMA. Thus, for such aspects, the AP 110 may be configured to communicate with both SDMA and non-SDMA user terminals. This approach may conveniently allow older versions of wireless communication devices 120 ("legacy" stations) that do not support SDMA to remain deployed in an enterprise, extending their useful lifetime, while allowing newer SDMA wireless communication devices to be introduced as deemed appropriate.

The system 100 employs multiple transmit and multiple receive antennas for data transmission on the downlink and uplink. The access point 110 is equipped with Nap antennas and represents the multiple-input (MI) for downlink transmissions and the multiple-output (MO) for uplink transmissions. A set of K selected wireless communication devices 120 collectively represents the multiple-output for downlink transmissions and the multiple-input for uplink transmissions. For pure SDMA, it is desired to have Nap≤K≤1 if the data symbol streams for the K wireless communication devices are not multiplexed in code, frequency or time by some means. K may be greater than Nap if the data symbol streams can be multiplexed using TDMA technique, different code channels with CDMA, disjoint sets of sub-bands with OFDM, and so on. Each selected wireless communication device may transmit user-specific data to and/or receive user-specific data from the access point. In general, each selected wireless communication device may be equipped with one or multiple antennas (i.e., Nut≥1). The K selected wireless communication devices can have the same number of antennas, or one or more wireless communication devices may have a different number of antennas.

The system 100 may be a SDMA system according to a time division duplex (TDD) or a frequency division duplex (FDD). For a TDD system, the downlink and uplink share the same frequency band. For an FDD system, the downlink and uplink use different frequency bands. The system 100 may also be a MIMO system utilizing a single carrier or multiple carriers for transmission. Each wireless communication device 120 may be equipped with a single antenna (e.g., in order to keep costs down) or multiple antennas (e.g., where the additional cost can be supported). The system 100 may also be a TDMA system if the wireless communication devices 120 share the same frequency channel by dividing transmission/reception into different time slots, where each time slot may be assigned to a different wireless communication device 120.

Figure 2:
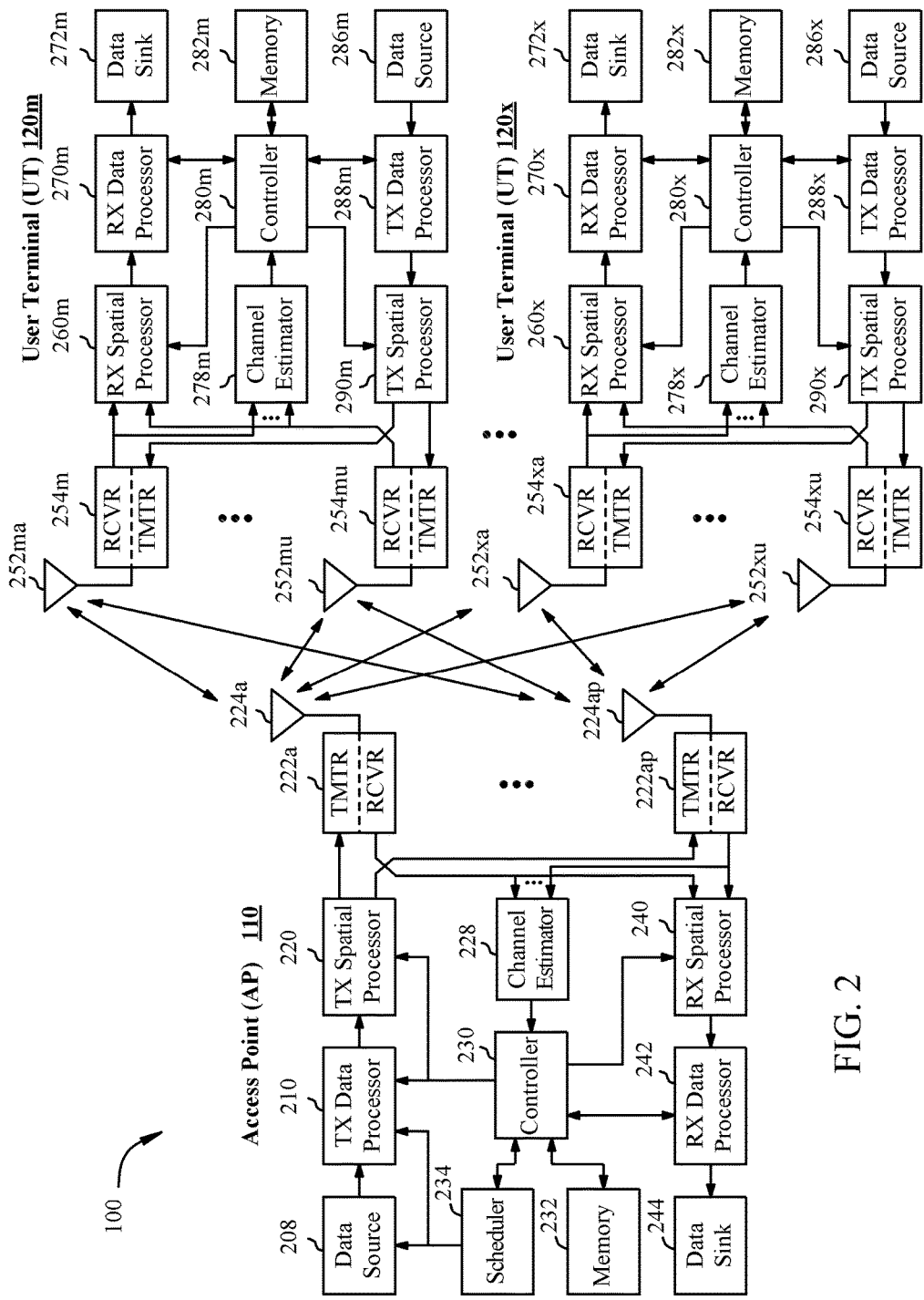
FIG. 2 illustrates a block diagram of the access point 110 and two user terminals 120m and 120x in a MIMO system.

FIG. 2 illustrates a block diagram of the access point 110 and two wireless communication devices (illustrated as user terminal 120m and user terminal 120x) in system 100 (illustrated as a MIMO system). The access point 110 is equipped with Nt antennas 224a and 224ap. The user terminal 120m is equipped with Nut,m antennas 252ma and 252mu, and the user terminal 120x is equipped with Nut,x antennas 252xa and 252xu. The access point 110 is a transmitting entity for the downlink and a receiving entity for the uplink. The wireless communication devices 120 are transmitting entities for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ wireless communication devices 120 are selected for simultaneous transmission on the uplink, and $N_{dl}$ wireless communication devices 120 are selected for simultaneous transmission on the downlink. $N_{up}$ may or may not be equal to $N_{dn}$, and $N_{up}$ and $N_{dn}$ may be static values or may change for each scheduling interval. Beam-steering or some other spatial processing technique may be used at the access point 110 and/or the wireless communication devices 120.

On the uplink, at each wireless communication device 120 selected for uplink transmission, a TX data processor 288 receives traffic data from a data source 286 and control data from a controller 280. The TX data processor 288 processes (e.g., encodes, interleaves, and modulates) the traffic data for the wireless communication device 120 based on the coding and modulation schemes associated with the rate selected for the wireless communication device 120 and provides a data symbol stream. A TX spatial processor 290 performs spatial processing on the data symbol stream and provides Nut,m transmit symbol streams for the Nut,m antennas. Each transmitter unit 254 receives and processes (e.g., converts to analog, amplifies, filters, and frequency upconverts) a respective transmit symbol stream to generate an uplink signal. Nut,m transmitter/receiver units 254 provide Nut,m uplink signals for transmission from Nut,m antennas 252, for example to transmit to the access point 110.

$N_{up}$ wireless communication devices 120 may be scheduled for simultaneous transmission on the uplink. Each of these wireless communication devices 120 may perform spatial processing on its respective data symbol stream and transmit its respective set of transmit symbol streams on the uplink to the access point 110.

At the access point 110, $N_{up}$ antennas 224a through 224ap receive the uplink signals from all $N_{up}$ wireless communication device 120 transmitting on the uplink. Each antenna 224 provides a received signal to a respective receiver unit 222. Each transmitter/receiver unit 222 performs processing complementary to that performed by transmitter/receiver unit 254 and provides a received symbol stream. A receive spatial processor 240 performs receiver spatial processing on the $N_{up}$ received symbol streams from $N_{up}$ transmitter/receiver units 222 and provides $N_{up}$ recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. A receive data processor 242 processes (e.g., demodulates, deinterleaves, and decodes) each recovered uplink data symbol stream in accordance with the rate used for that stream to obtain decoded data. The decoded data for each wireless communication device 120 may be provided to a data sink 244 for storage and/or a controller 230 for further processing.

On the downlink, at the access point 110, a TX data processor 210 receives traffic data from a data source 208 for Ndn wireless communication devices 120 scheduled for downlink transmission, control data from a controller 230, and possibly other data from a scheduler 234. The various types of data may be sent on different transport channels. TX data processor 210 processes (e.g., encodes, interleaves, and modulates) the traffic data for each wireless communication device 120 based on the rate selected for that wireless communication device 120. The TX data processor 210 provides Ndn downlink data symbol streams for the Ndn wireless communication devices 120. A TX spatial processor 220 performs spatial processing (such as a precoding or beamforming) on the Ndn downlink data symbol streams, and provides $N_{up}$ transmit symbol streams for the $N_{up}$ antennas. Each transmitter/receiver unit 222 receives and processes a respective transmit symbol stream to generate a downlink signal. $N_{up}$ transmitter/receiver units 222 may provide $N_{up}$ downlink signals for transmission from $N_{up}$ antennas 224, for example to transmit to the wireless communication devices 120.

At each wireless communication device 120, Nut,m antennas 252 receive the $N_{up}$ downlink signals from the access point 110. Each transmitter/receiver unit 254 processes a received signal from an associated antenna 252 and provides a received symbol stream. An receive spatial processor 260 performs receiver spatial processing on Nut,m received symbol streams from Nut,m transmitter/receiver units 254 and provides a recovered downlink data symbol stream for the wireless communication device 120. The receiver spatial processing may be performed in accordance with the CCMI, MMSE, or some other technique. A receive data processor 270 processes (e.g., demodulates, deinterleaves and decodes) the recovered downlink data symbol stream to obtain decoded data for the wireless communication device 120.

At each wireless communication device 120, a channel estimator 278 estimates the downlink channel response and provides downlink channel estimates, which may include channel gain estimates, signal to noise ratio (SNR) estimates, noise variance and so on. Similarly, a channel estimator 228 estimates the uplink channel response and provides uplink channel estimates. Controller 280 for each user terminal typically derives the spatial filter matrix for the wireless communication device 120 based on the downlink channel response matrix Hdn,m for that wireless communication device 120. Controller 230 derives the spatial filter matrix for the access point 110 based on the effective uplink channel response matrix Hup,eff. The controller 280 for each wireless communication device 120 may send feedback information (e.g., the downlink and/or uplink eigenvectors, eigenvalues, SNR estimates, and so on) to the access point 110. The controllers 230 and 280 may also control the operation of various processing units at the access point 110 and wireless communication devices 120, respectively.

Figure 3:
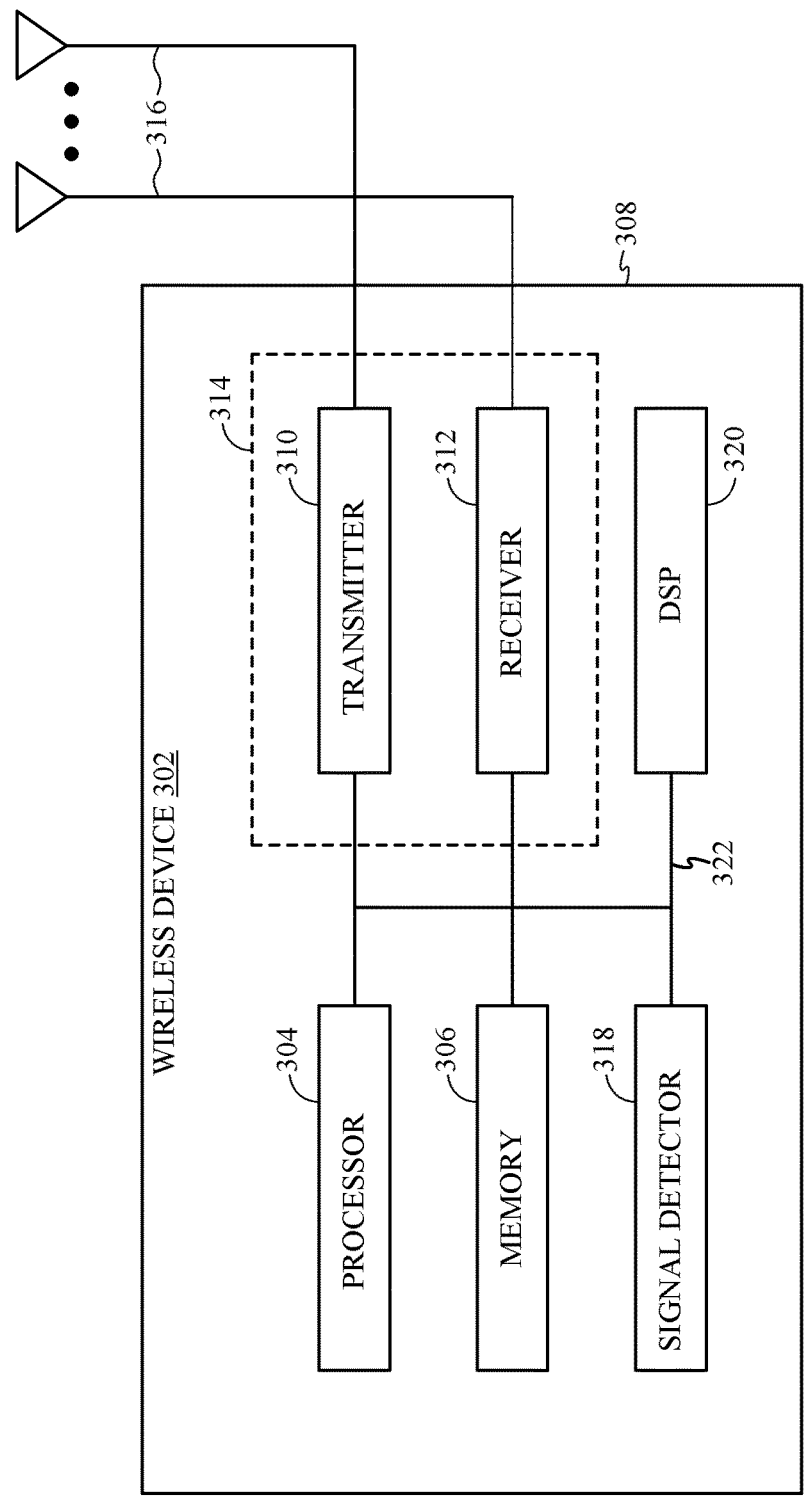
FIG. 3 illustrates various components that may be utilized in a wireless device that may be employed within a wireless communication system.

FIG. 3 illustrates various components that may be utilized in a wireless communication device 302 that may be employed within the wireless communication system 100. The wireless communication device 302 is an example of a device that may be configured to implement the various methods described herein. The wireless communication device 302 may implement an access point 110 or a wireless communication device 120.

The wireless communication device 302 may include an electronic hardware processor 304 which controls operation of the wireless communication device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless communication device 302 may also include a housing 308 that may include a transmitter 310 and a receiver 312 to allow transmission and reception of data between the wireless communication device 302 and a remote location. The transmitter 310 and receiver 312 may be combined into a transceiver 314. A single or a plurality of transceiver antennas 316 may be attached to the housing 308 and electrically coupled to the transceiver 314. The wireless communication device 302 may also include (not shown) multiple transmitters, multiple receivers, and multiple transceivers.

The wireless communication device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless communication device 302 may also include a digital signal processor (DSP) 320 for use in processing signals.

The various components of the wireless communication device 302 may be coupled together by a bus system 322, which may include a power bus, a control signal bus, and a status signal bus in addition to a data bus.

Certain aspects of the present disclosure support transmitting data packets from multiple STAs to an AP. In some embodiments, the data packets may be transmitted in a multi-user MIMO (MU-MIMO) system. Alternatively, the data packets may be transmitted in a multi-user-FDMA (MU-FDMA), multi-user OFDMA (MU-OFDMA) or similar Frequency Division Multiple Access (FDMA) system. In these embodiments, uplink MU-MIMO, uplink OFDMA, or similar uplink FDMA system transmissions can be sent simultaneously from multiple STAs to an AP and may create efficiencies in wireless communication.

Figure 4:
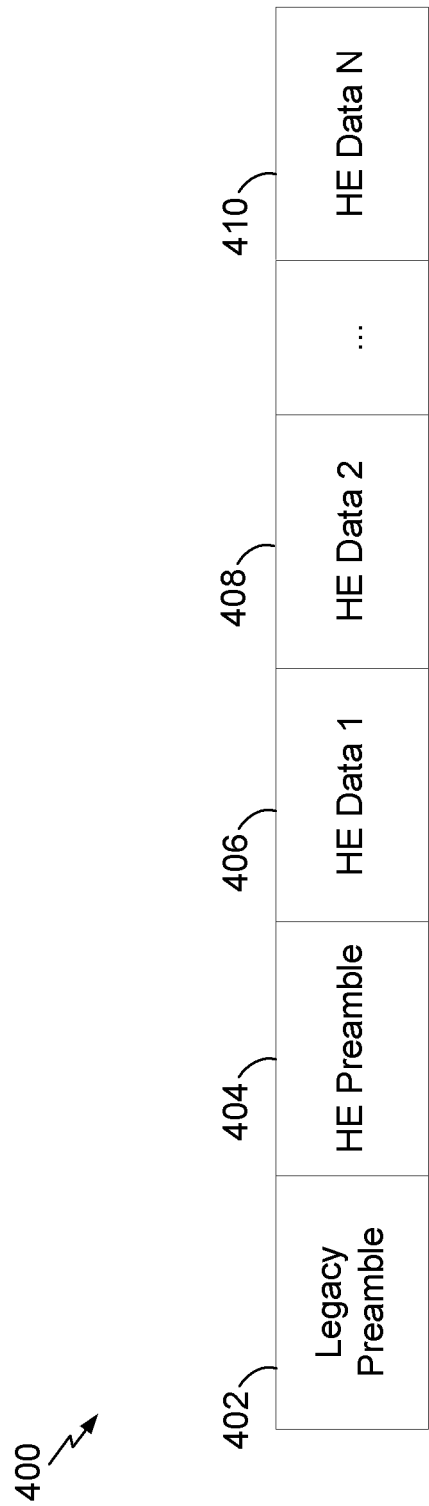
FIG. 4 illustrates an exemplary data packet, in accordance with one embodiment.

FIG. 4 illustrates an exemplary data packet 400, in accordance with one embodiment. In some aspects, one or more of the wireless communication devices 120 may transmit data packet 400 to AP 110. In some aspects, AP 110 may transmit data packet 400 to one or more of the wireless communication devices 120. In various aspects, data packet 400 is transmitted over a plurality of symbols. The number of symbols used to transmit data packet 400 can vary greatly depending on the contents thereof. As illustrated, data packet 400 comprises legacy preamble 402, high efficiency (HE) preamble 404, and HE data 406 through 410.

In various aspects, data packet 400 may include data transmitted in accordance with an IEEE 802.11ax format. In accordance with these aspects, the amount of information transmitted in data packet 400 can be approximately four times more than the information transmitted in accordance with other protocols (e.g., 802.11a). In various embodiments, multiple data packets 400 may be transmitted in series to a receiving device (e.g., wireless communication device 120 or AP 110). In accordance with these embodiments, there may only be a SIFS (Short Interframe Space) between consecutive transmissions of the multiple data packets 400. However, a SIFS time period between packets may not be a sufficient amount of processing time for a device receiving the packet 400 to completely process the packet before a second packet arrived. This may especially be the case when the packet 400 has four times the information than, for example, an 802.11a packet. Accordingly, various systems and methods for providing the receiving device with additional processing time are described.

Figure 5A:
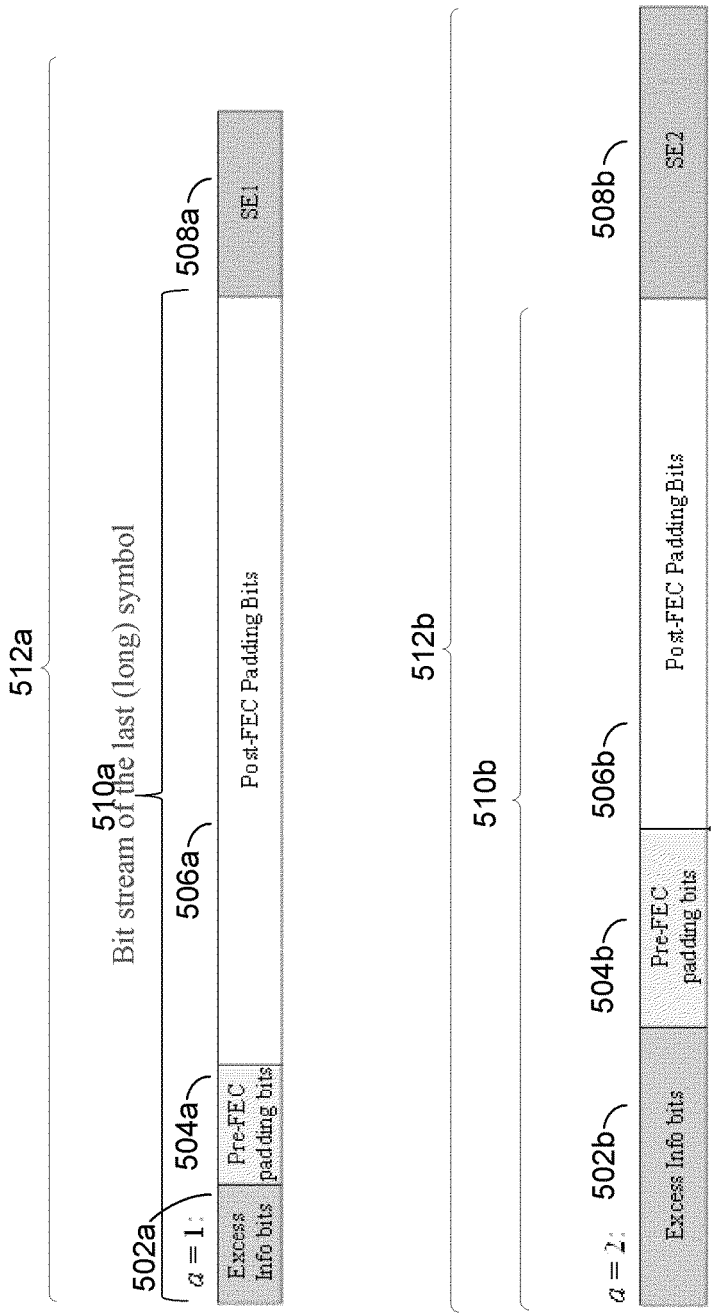
FIG. 5A illustrates various final symbols with signal extension (SE) of an exemplary data packet, in accordance with one embodiment.
Figure 5B:
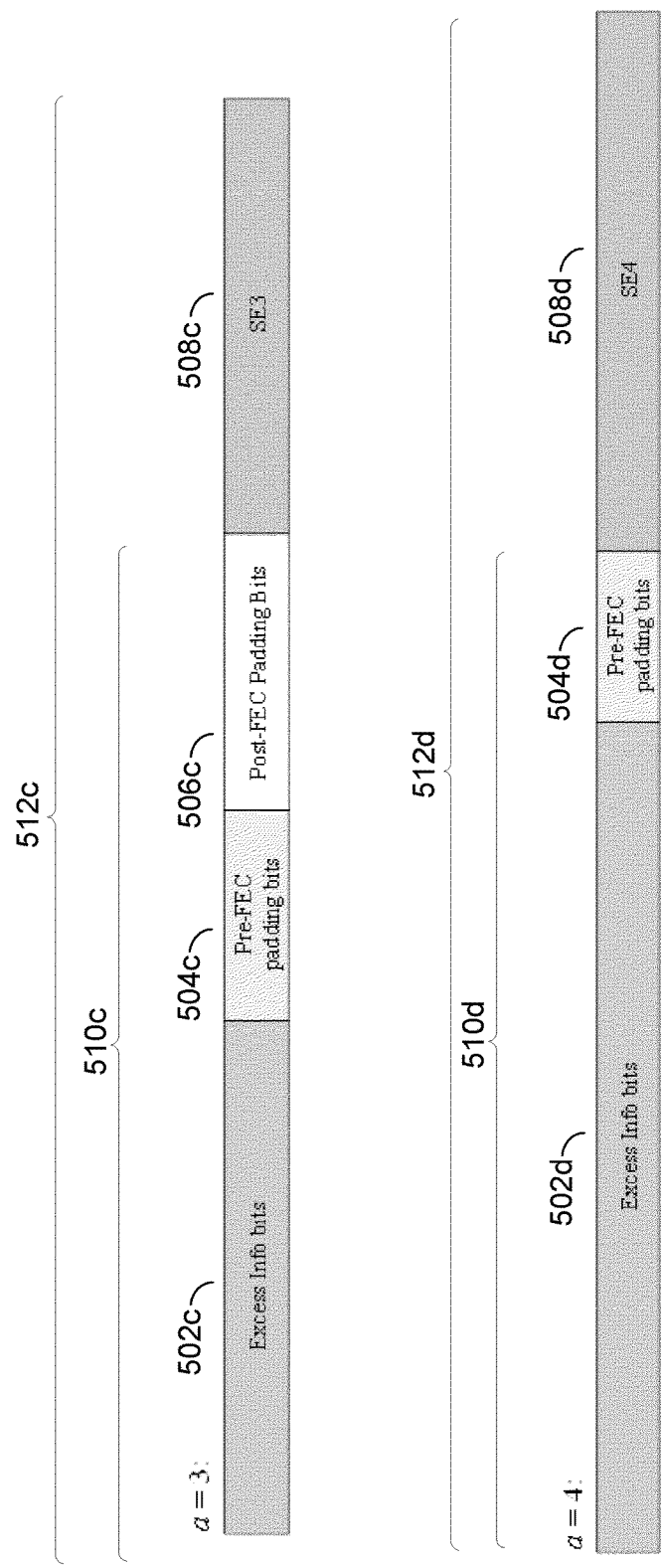
FIG. 5B illustrates various final symbols with signal extension (SE) of an exemplary data packet, in accordance with one embodiment.

FIGS. 5A-B illustrates various final symbols with signal extension (SE) of an exemplary data packet, in accordance with one embodiment. In some aspects, a transmitting device (e.g., wireless communication device 120 or AP 110) may append a SE to the end of the final symbol of a data transmission to afford a receiving device with additional processing time. If a receiving device is not receiving any "useful" information in at least a portion of the final symbol of a data transmission, the receiving device is not required to process those bits that are not "useful". This enables the receiver to process a smaller number of bits in the last symbol which can be completed in a smaller amount of time (within SIFS+the signaling extension (SE) time when the SE is added to the last symbol or within SIFS alone if SE is not added)

Useful bits may include, for example, data bits encoding user data included in the data packet, and, in some aspects, bits necessary to properly decode the data bits from the packet. In some aspects, useful bits may be a first type of bits, while other bits may be a second type of bits. In some aspects, useful bits may be bits associated with a first layer in a layered protocol architecture. For example, in some aspects using 802.11, the 802.11 protocol may utilize one or more bits in each packet for signaling purposes. Other bits in a packet may be provided by a higher layer, for example, an application layer. In some aspects, the bits provided by the higher layer, i.e. above the 802.11 layer, may be considered useful bits. These higher layer bits may be considered a first type of bits, while bits utilized for 802.11 signaling may be considered a second type of bits. In some aspects, useful bits may be utilized for encoding data bits received from a higher level protocol or application layer.

Accordingly, in some aspects the amount, length, or size of the SE can depend on how much information is remaining (also referred to as "excess") in the final symbol. In various aspects, four different sizes of SE may be used based on how much information is remaining in the final symbol. In some aspects, each size may correspond to a percentage (e.g., 25%, 50%, 75%, 100%), but may be represented by an integer (e.g., 1-4) or a two bit indication (e.g., 00, 01, 10, or 11). In accordance with these aspects, various cut-offs may be utilized (also referred to as "a," the "a factor," or the "a value") by the transmitting and receiving devices. For example, "a=1" may refer to the first quarter of the final symbol, "a=2" may refer to the second quarter of the final symbol, "a=3" may refer to the third quarter of the final symbol, and "a=4" may refer to the fourth quarter of the final symbol. Although four values for the a value are discussed herein, it will be appreciated that other numbers may be used. In some aspects, the a value may refer to a fraction of "useful bits" in the final symbol of the data transmission (e.g., an a value of 1 can indicate that the first quarter of bits convey information to the receiving device, and an a value of 2 can indicate that the first half of the bits convey information that may be used by the receiving device).

In various aspects, a device transmitting this data may be able to determine the length of the excess information bits in the final symbol, and in turn, what value 'a' to include in a packet, a priori, based on information about the entire transmission (e.g., data packet 400). Thereafter, a device receiving this data may be able to determine what a value to use based on information about the data (e.g., the length of the packet).

Illustrated in FIG. 5A, packet 512a is shown with a=1. Packet 512a includes excess information bits 502a remaining within the first quarter of the final symbol 510a of packet 512a. In some aspects, a transmitting device may add pre-FEC (frame-error checking) padding bits 504a up to the boundary corresponding to the first quarter (25%) of the symbol 510a. When processing the symbol 510a, a receiving device may only process the bits untilthe end of pre-FEC padding bits 504a. Thus, bits included in the Post-FEC padding field 506a and the SE1 field 508a may be received but not processed by a device receiving the packet 512a.

In some aspects, a transmitting device may add post-FEC padding bits 506a at the end of the symbol 510a, in some cases after pre-FEC padding bits, and may add SE 508a of a first length to the end of the packet 512a. In accordance with these aspects, a receiving device may use the time corresponding to the time it would normally require to process received bits, to instead of processing or decoding the post-FEC padding bits 506a and SE 508a, the device may process the other information received in the packet 512a. After a SIFS time period after the end of the symbol 510a and SE 508a have been transmitted, a transmitting device of packet 512a may transmit another data packet.

Packet 512b may include SE 508b of a second length when a=2 (excess info bits 502b within the first half of symbol 510b). Packet 512b may also be generated to include Pre-FEC padding bits 504b and Post-FEC Padding Bits 506b within the symbol 510b. Note FIG. 5A not to scale.

Turning to FIG. 5B, packet 512c may include SE 508c of a third length when a=3 (excess info bits 502c within the first three quarters of symbol 510c). Packet 512c may also be generated to include Pre-FEC padding bits 504c and Post-FEC Padding Bits 506c within the symbol 510c.

Packet 512d may include SE 508d of a fourth length when a=4 (excess info bits 502d within all four quarters of symbol 510d). Packet 512d may include pre-FEC padding bits 504d and post-FEC-padding bits 506d within the symbol 510d. In various aspects, the first length may be 4 μs, the second length may be 8 μs, the third length may be 12 μs, and the fourth length may be 16 μs. In some aspects, one or more of packets 512a-d may not include SE field 508a-d.

Figure 6:
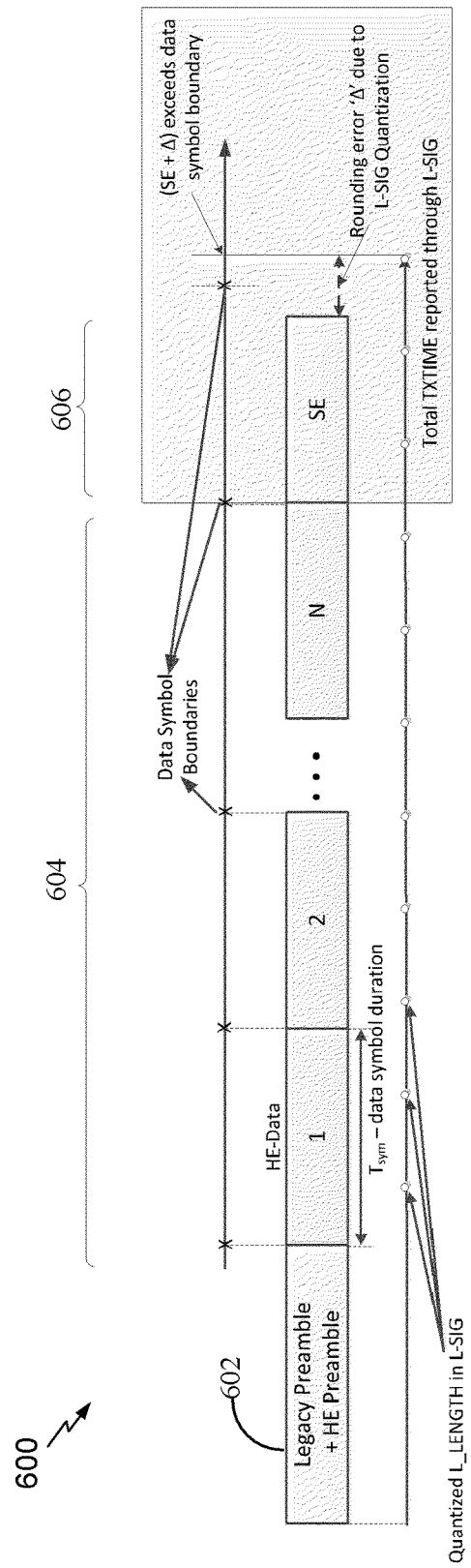
FIG. 6 illustrates an exemplary transmission of a data packet with SE, in accordance with one embodiment.

FIG. 6 illustrates an exemplary transmission of a data packet 600 with SE, in accordance with one embodiment. As illustrated, packet 600 comprises a legacy preamble and HE preamble 602, HE data 1-N transmitted over a plurality of symbols 604, and SE 606 appended to the end. Each of the individual symbols within 604 has a data symbol duration (not shown). In some aspects, a device receiving packet 600 may calculate the number of symbols required to receive the packet 600, based at least in part upon a transmission length.

In some aspects, a transmission length of the packet 600 is provided in the legacy preamble or the HE preamble 602. However, a quantization of the transmission length may create ambiguities due to a "rounding error" Δ. Accordingly, in various aspects, a transmitting or receiving device may determine that an applied SE will cause processing inefficiencies based on the rounding error Δ. For example, in one aspect, a transmitting or receiving device of packet 600 may determine that the length of the applied SE 606 plus a length of the rounding error Δ is greater than the data symbol duration discussed above.

Accordingly, a transmitting device may transmit a "SE disambiguation indication" (or bit) as part of the packet 600 to indicate to a receiving device whether or not this issue is present. Accordingly, in some aspects, a transmitting device can set the SE disambiguation indication to a value of '1' when this issue is present, and the receiving device may, based at least in part on this indication, reduce a calculated number symbols within the packet 600 (e.g., calculated by the receiving device when receiving the transmission) by one.

Figure 7A:
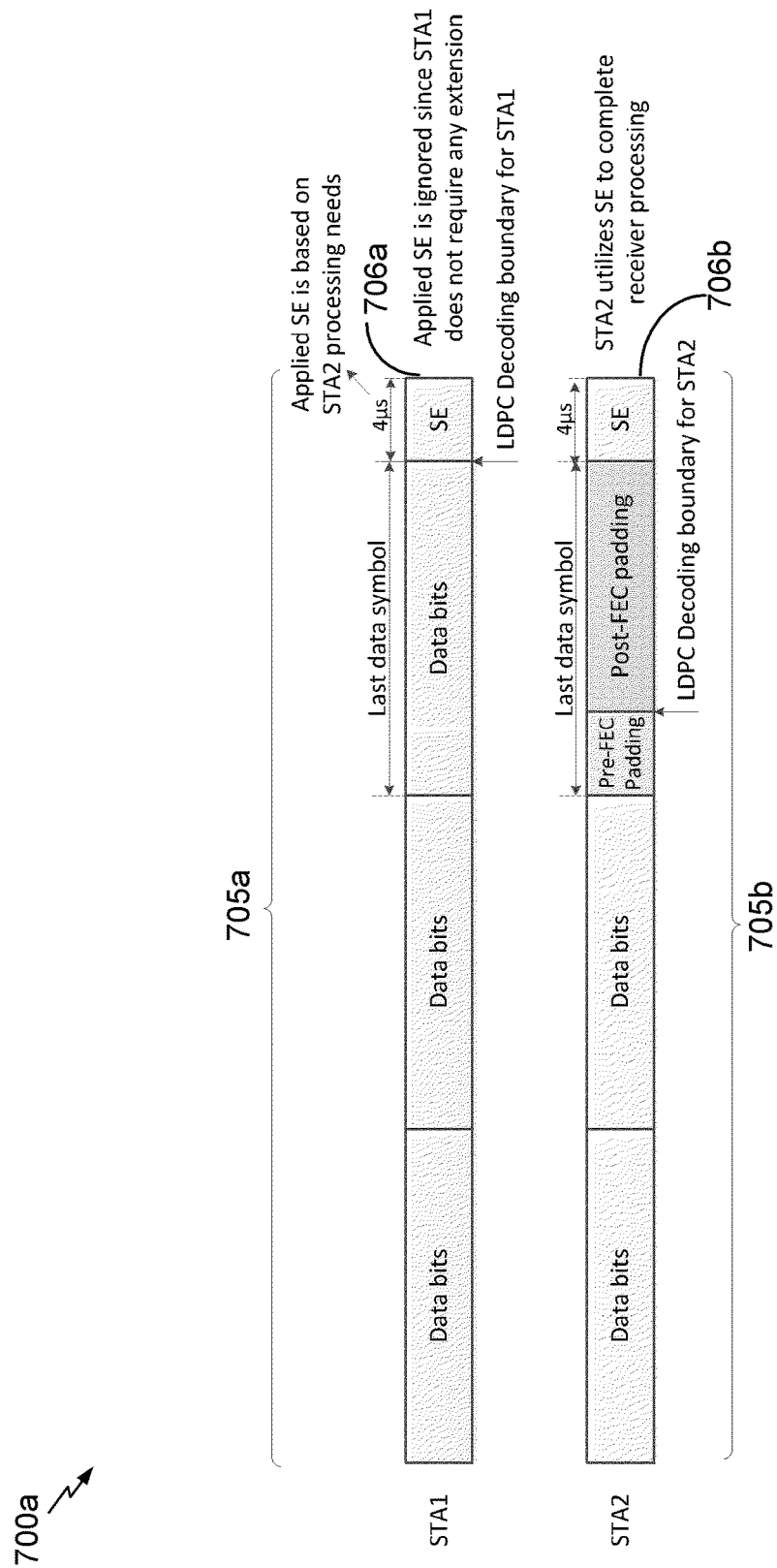
FIG. 7A illustrates an exemplary transmission of data packets with SE in a multi-user scenario, in accordance with one embodiment.

FIG. 7A illustrates an exemplary transmission 700a of data packets 705a-b with SE in a multi-user scenario, in accordance with one embodiment. As described above, an AP 110 may transmit packets to more than one wireless communication device 120 at a time. In accordance with these aspects, the data within each of the packets transmitted to each wireless communication device 120 may vary. In some aspects, it may be desirable to add information (e.g., padding bits) to the packets including less data such that a length of the multiple packets is the same. As discussed above, in some aspects, it may be beneficial to add SE to the packets to afford the receiving device with additional processing time. In various aspects, if SE is needed at the end of one of the packets, SE is added to the end of all of the packets, so that all of the transmissions are of the same size. For example, as illustrated, the packet 705a received by a first station STA1 (e.g., wireless communication device 120) may comprise SE 706a based upon the processing needs of a second station STA2. When the first station STA1 receives the packet 705a with SE 706a, the first station STA1 may ignore the SE 706a.

Figure 7B:
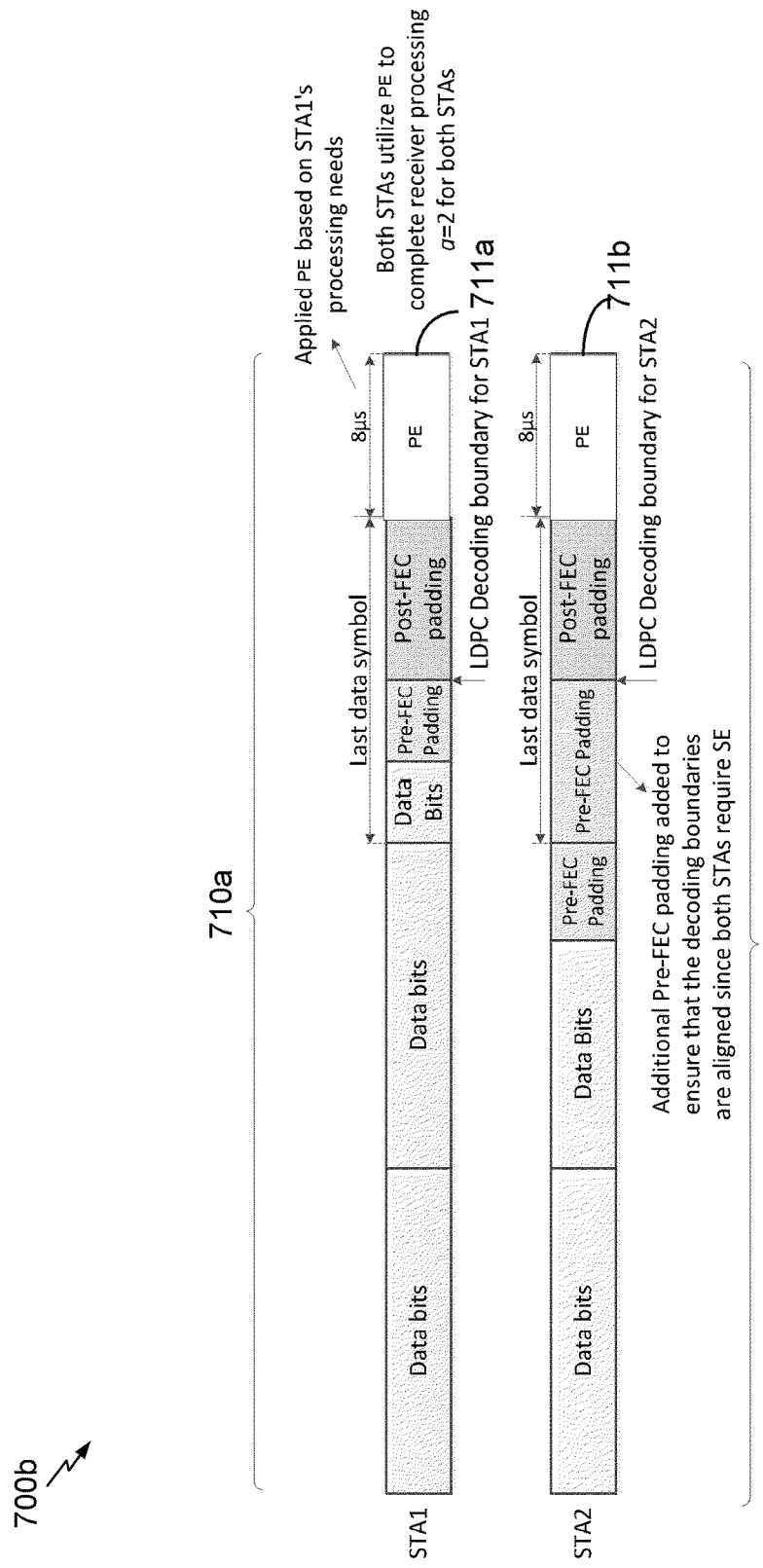
FIG. 7B illustrates an exemplary transmission of data packets with SE in a multi-user scenario, in accordance with one embodiment.

FIG. 7B illustrates an exemplary transmission 700b of data packets 710a-b with SE in a multi-user scenario, in accordance with one embodiment. In various aspects, a signaling extension (SE) 711a-b may be added to the end of a data transmission (e.g., after the last symbol of the last data packet). In some aspects, a receiving device may receive communications in accordance with a modulation and coding scheme (MCS). For example, the first station STA1 in FIG. 7B may receive communications in accordance with MCS2 while the second station STA2 may receive communications in accordance with MCS7. Accordingly, in various embodiments, multi-user transmissions may utilize SEs that are specialized for each different MCS of the receiving devices. In various embodiments, the SE may be added to the end of a data transmission to extend the amount of processing time a receiving device has to process the communication before another data transmission is sent. In one aspect, a SE may be any one of 0 μs, 8 μs, or 16 μs.

In some aspects, a receiving device may signal its MCS capabilities (e.g., thresholds) upon association. These thresholds may indicate, based on the MCS a receiving device is using, whether the receiving device is capable of receiving a communication without additional processing time, and otherwise, if additional processing time is required, how much. In one aspect, during association procedure, a wireless communication device 120 may use eight bits to signal two thresholds to an AP 110. The first four of the bits can correspond to the first MCS threshold, and the latter four bits can correspond to the second MCS threshold. One embodiment of these thresholds is provided below in Table 1. For example, wireless communication device 120 may signal "00110110" during association to signal that it requires 0 μs of processing time for MCS0 through MCS3, 8 μs of processing time for MCS4 through MCS7, and 16 μs of processing time for MCS8 and up.

TABLE 1

| Signaled Value for each (Bw, Nss) combination 2 of these values are signaled | Interpretation for 8 µs | Interpretation for 16 µs |
| --- | --- | --- |
| 0000 | 8 µs required for >MCS0 | 16 µs required for >MCS0 |
| 0001 | 8 µs required for >MCS1 | 16 µs required for >MCS1 |
| 0010 | 8 µs required for >MCS2 | 16 µs required for >MCS2 |
| 0011 | 8 µs required for >MCS3 | 16 µs required for >MCS3 |
| 0100 | 8 µs required for >MCS4 | 16 µs required for >MCS4 |
| 0101 | 8 µs required for >MCS5 | 16 µs required for >MCS5 |
| 0111 | 8 µs required for >MCS6 | 16 µs required for >MCS6 |
| 0110 | 8 µs required for >MCS7 | 16 µs required for >MCS7 |
| 0111 | 8 µs required for >MCS8 | 16 µs required for >MCS8 |
| 1000 | 8 µs required for >MCS9 | 16 µs required for >MCS9 |
| 1001 | 8 µs is not required for any MCS | 16 µs is not required for any MCS |

Figure 7C:
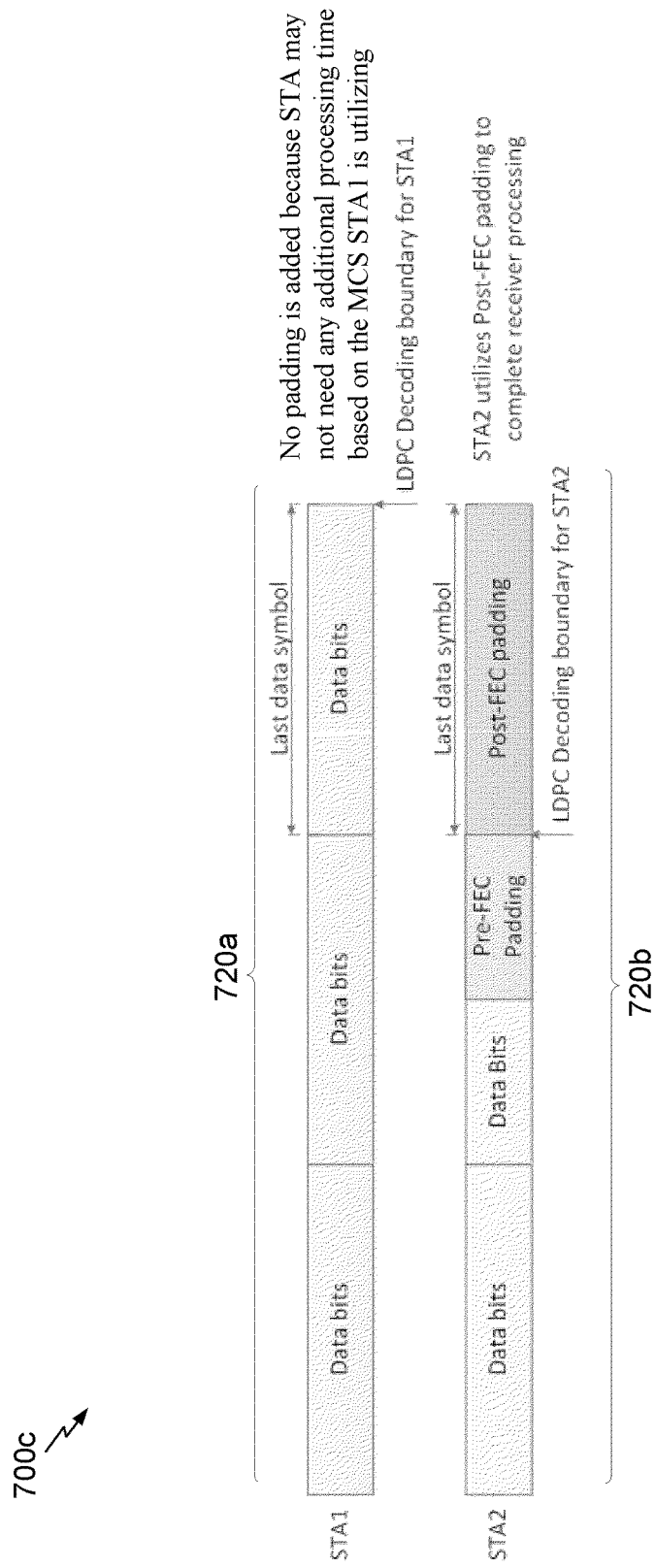
FIG. 7C illustrates another exemplary transmission of data packets with SE in a multi-user scenario, in accordance with one embodiment.

FIG. 7C illustrates another exemplary transmission 700c of data packets 720a-b with SE in a multi-user scenario, in accordance with one embodiment. In some aspects, although the entire last data symbol may contain useful bits for the first station STA1, the first station STA1 may not need any additional processing time, based on the MCS the first station STA1 is utilizing to receive its portion of the transmission 700c. Further, in some aspects, the second station STA2 may have indicated that it requires 16 µs of additional processing time based on the MCS utilized, and the last data symbol for the second station STA2 may not contain any useful bits. Accordingly, rather than automatically adding a SE of 16 µs to the end of the transmission 700c based on the second station's STA2 thresholds indicated at association, the transmitting device may pad the final data symbol of the transmission for the second station STA2 so that the second station STA2 may still be afforded the 16 µs it needs. In some other aspects, a signaling extension of 16 us may be added. Methods and apparatuses for providing this solution are described in further detail below.

Figure 8:
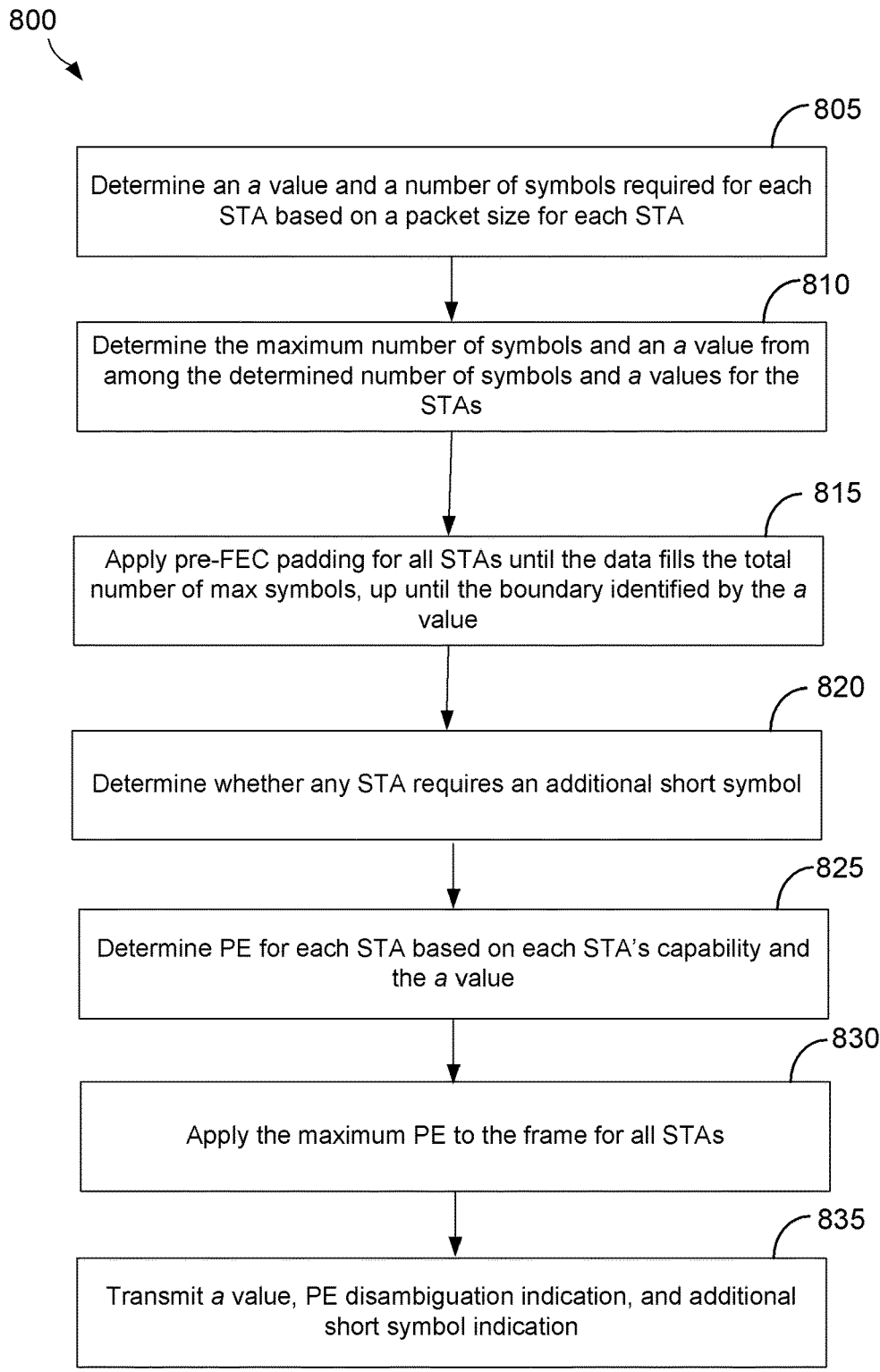
FIG. 8 is a flow chart of an aspect of an exemplary method of wireless communication.

FIG. 8 is a flow chart of an aspect of an exemplary process 800 of wireless communication. Process 800 may also be considered a method of wireless communication. Process 800 may be performed, in some aspects, by the device 302 discussed above with respect to FIG. 3. For example, in some aspects, instructions stored in the memory 306 may configure the processor 304 to perform one or more of the functions discussed above with respect to process 800.

In some aspects, process 800 may be utilized to transmit data with SE from an AP 110 to a wireless communication device 120. Prior to the start of process 800, the content of the data to be transmitted and the wireless communication devices 120 to which the data is to be transmitted may be known.

Block 805 of process 800 determines a corresponding a value ($a_u$) and a corresponding number of symbols required ($N_{sym,u}$) to transmit a corresponding plurality of data bits to each STA. This determination may be made, at least in part upon a first initial packet size of the transmission including the data bits for each STA. Further, the a value may be one of 1, 2, 3, or 4, and may correspond to one of the four boundaries described above. In some aspects, the a value for each STA may be based on a corresponding fraction of useful bits in a final symbol of the symbols required to transmit the corresponding plurality of data bits to the corresponding STA. In some aspects, the fraction of useful bits may be a fraction of bits encoding the corresponding plurality of data bits.

In block 810, a maximum number of symbols ($N_{sym,init}$) and a maximum fraction of bits (a value ($a_{init}$)) for the plurality of data bits is determined based on the determined number of symbols and the a values for all STAs. In some aspects, the maximum fraction of bits may be a maximum fraction of useful bits. In some aspects, the maximum number of symbols may be determined separately from the maximum a value. In other aspects, the maximum a value is associated with an STA having the maximum number of symbols to be transmitted. This determination may be made according to the following formulas.

$$N_{sym,\ init} = \max_{\forall u} N_{sym,\ u}$$

$$k = \underset{\forall u}{\operatorname{argmax}} N_{sym,u} \rightarrow$$

selects me kth user that has the maximum number of symbols to be transmitted.

$a_{init} = a_k \rightarrow$ select $a_{init}$ as the a value corresponding to the user that has the maximum number of symbols to be transmitted.

In block 815, pre-FEC padding is applied for the STAs until the data fills the total number of the maximum number of symbols ($N_{sym,\ init}$) up until a boundary identified by the maximum a value ($a_{init}$). As a result, the length of each of the data packets including the padding can be the same. The pre-FEC padding is applied by the media access control (MAC) layer and is considered to be part of the information bits to be decoded by the STA.

Block 820 determines whether any of the wireless communication devices (STAs) require an additional symbol, such as an additional short symbol. In some aspects, a STA may require an additional short symbol due to an encoding method of a data packet transmitted to the STA. For example, low density parity check (LDPC) encoded packets may require an additional short symbol in some aspects. In one aspect, a short symbol corresponds to one fourth of the length of the symbol. In accordance with this aspect, some aspects of block 820 may including altering one or more of the fraction of useful bits or the number of symbols required if any one of the plurality of wireless communication devices requires an additional short system. For example, the maximum a value and the maximum number of symbols required may be altered. If the maximum a value is less than 4, then the value of 1 is added thereto in some aspects. However, if the maximum a value is 4, then the value thereof is changed to 1, and the value of 1 is added to the maximum number of symbols required. For example:

If ($a_{init}$<4); a=$a_{init}$+1; $N_{sym}$=$N_{sym,\ init}$
If ($a_{init}$=4); a=1; $N_{sym}$=$N_{sym,\ init}$+1

Block 825 determines, for each of the plurality of wireless communication devices, a corresponding signaling extension length of extension bits (SE) for each STA ($PE_u$) based at least in part on the corresponding fraction of useful bits (a value) and a modulation and coding scheme (MCS) capability of each of the plurality of wireless communication devices. For example, as described above, a wireless communications device 120 may have indicated that it requires 0 µs of processing time for MCS0 through MCS3, 8 µs of processing time for MCS4 through MCS7, and 16 µs of processing time for MCS8 and up. Accordingly, AP 110 may determine what MCS the device is currently using, and compare this to the thresholds set during association. For example, if the wireless communications device 120 is currently using MCS4, the AP 110 can determine that a 8 µs SE is necessary for this device. In some aspects, AP 110 may determine that some or all of this additional processing time is already available to the wireless communications device 120, based at least in part on the a value. For example, if the a value is 2, then the wireless communications device 120 may have 8 µs free after the end of the last symbol to process the received data. However, if the a value is 3, for example, the wireless communications device 120 may only have 4 µs of time to process the data after the end of the symbol. Accordingly, in some aspects, AP 110 may determine that the wireless communications device 120 requires a SE of 4 µs to properly process the transmission. Similarly, if a wireless communications device 120 requires 16 µs of processing time, and the a value is 3, the AP 110 may determine that the wireless communications device 120 requires a SE of 12 µs to be added to the end of the transmission. AP 110 may utilize the a value of the particular wireless communications device 120, or may utilize the maximum a value for this purpose. AP 110 may perform this process for each of the wireless communications devices 120 receiving data in order to determine the maximum PE. Next, process 800 entails applying the maximum SE to the frame for all STAs. At this point, the transmission length for all of the STAs can be the same.

Block 830 may include generating a plurality of data packets, each data packet including the corresponding data bits and extension bits of the corresponding signaling extension length after the final symbol for each of the plurality of data bits. In some aspects, the plurality of data packets are generated to include the padding bits after the data bits discussed above. The padding bits may be included in the data packet until a bit location indicated by the maximum fraction of useful bits in the maximum number of symbols, based at least in part upon a length of the corresponding data bits.

Block 835 transmits the plurality of data packets to each of the plurality of wireless communication devices respectively. Each of the plurality of data packets may include one or more of the corresponding indication of the a value (e.g. or a corresponding first indication of the fraction of useful bits), SE disambiguation indication as described above with reference to FIG. 6, and a second indication of whether an additional short symbol indication was added or is contained in the data packet based on the requirements of at least one of the wireless communications devices 120.

In some aspects, one or more of the a values may be indicated by two bits, the SE disambiguation indication may be one bit, and the additional short symbol indication may be one bit (for a total of four bits). In one aspect, these bits may be provided in the header of the packet being transmitted, such as in an L-SIG or an HE-SIG of the packet header. It should be appreciated that additional functions may be present in process 800, and that not all of the functions discussed above with respect to process 800 may be necessary. In some aspects, the transmitter 310 may be configured to perform the transmission described with respect to block 835.

Figure 9:
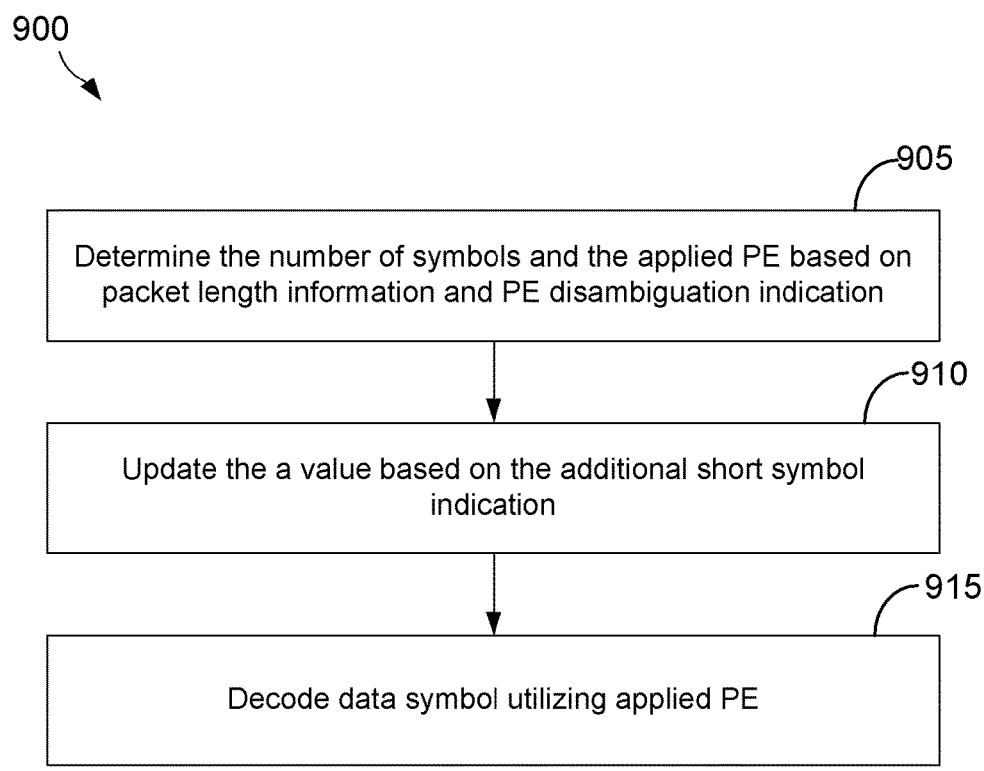
FIG. 9 is a flow chart of an aspect of an exemplary method of wireless communication.

FIG. 9 is a flow chart of an aspect of an exemplary process 900 of wireless communication. In some aspects, process 900 may be utilized by a wireless communications device 120 to receive data with SE from an AP 110. In some aspects, the process 900 may be performed by the device 302, discussed above with respect to FIG. 3. For example, in some aspects, instructions stored in the memory 306 may configure the processor 304 to perform one or more of the functions discussed below with respect to process 900.

Block 905 determines a number of symbols and an applied SE based on packet length information and a SE disambiguation indication. As described above, this information may be indicated in a header of a packet that a device, performing process 900, such as the device 120, receives. The packet may be received, in some aspects, by the receiver 312.

In block 910, the a value is updated based on the additional short symbol indication. This updating may be the reverse of the process performed by the AP 110. For example, if the a value is greater than 1, then a value of 1 may be subtracted from the a value. However, if the a value is 1, then the a value may be set to 4, and the calculated number of symbols may be reduced by one. For example, if LDPC additional short symbol bit=1:

If a>1, then a=a−1 and $N_{sym}$ is unchanged

If a=1, then a=4; $N_{sym}=N_{sym}-1$

In block 915, a data symbol is decoded utilizing the applied PE. For example, the data symbol may be decoded from the received packet discussed above based on the PDPC decoding process, and the wireless communication device 120 may utilize the processing time provided by SE as a buffer to complete processing of the data transmission. Block 915 may include processing the decoded data symbol. For example, the decoded data symbol may be utilized to form byte values of the received packet.

Figure 10:
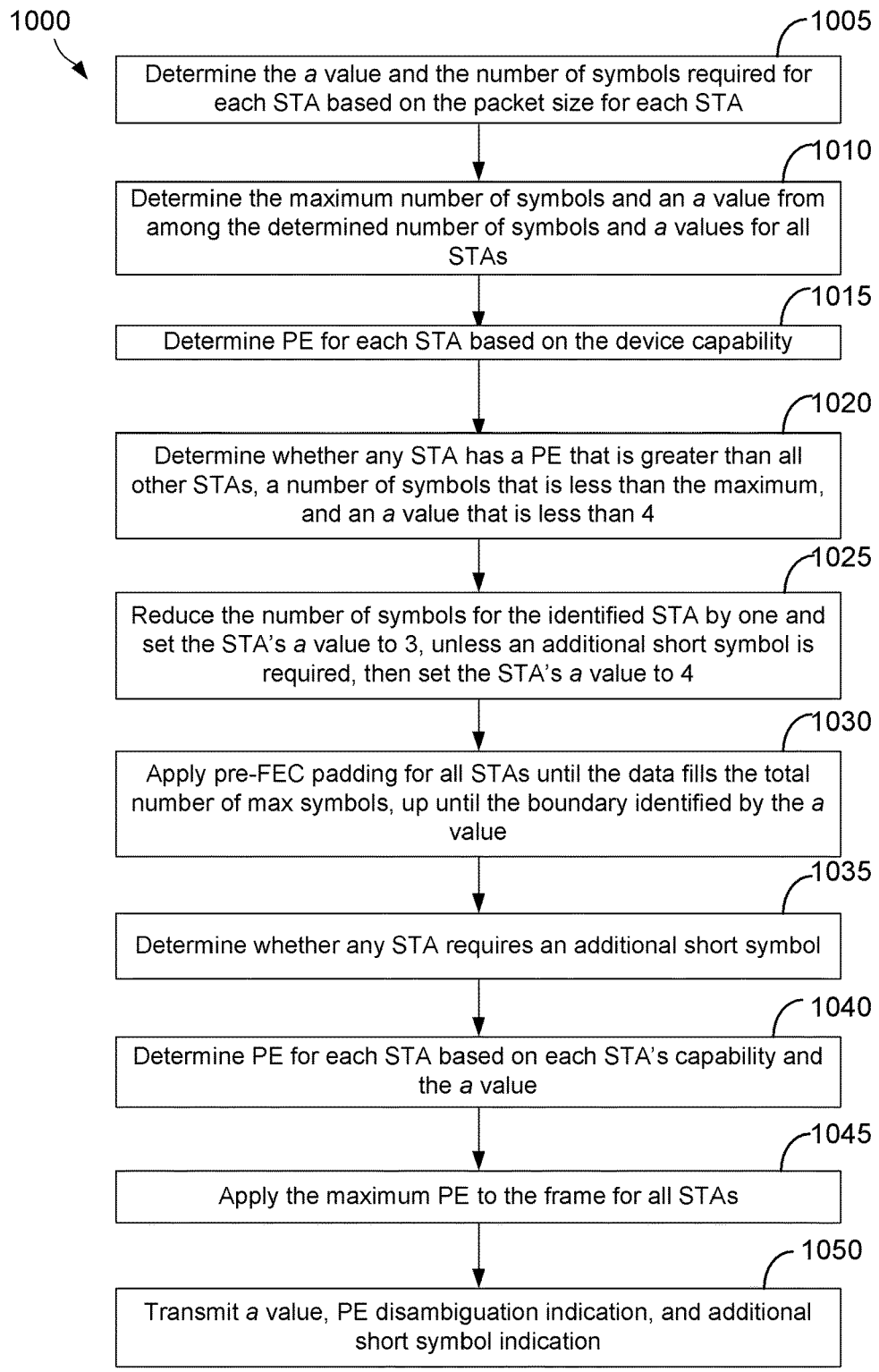
FIG. 10 is a flow chart of an aspect of an exemplary method of wireless communication.

FIG. 10 is a flow chart of an aspect of an exemplary process 1000 of wireless communication. In some aspects, process 1000 may be utilized to transmit data with SE from an AP 110 to a wireless communication device 120. Process 1000 may be similar to process 800 of FIG. 8, but may provide additional or alternative processing efficiencies. Prior to the start of process 1000, the content of the data to be transmitted and the wireless communication devices 120 to which the data is to be transmitted may be known. As illustrated, process 1000 first involves determining the a value and the number of symbols required for each STA based on the packet size for each STA. This determination may be made, at least in part upon the packet size of the transmission for each STA. Further, the a value may be one of 1, 2, 3, or 4, and may correspond to one of the four boundaries described above.

Next, process 1000 entails determining the maximum number of symbols and an a value from among the determined number of symbols and a values for all STAs. In some aspects, the maximum number of symbols may be determined separately from the maximum a value. In other aspects, the maximum a value corresponds to the a value associated with the STA that has the maximum number of symbols to be transmitted. Next, process 1000 entails determining SE for each STA based on the device capability (e.g., 0 µs, 8 µs, or 16 µs based on the current MCS as compare to the thresholds indicated by the wireless communications device 120 at association).

Next, process 1000 entails determining whether any STA has a SE that is greater than all other STAs, a number of symbols that is less than the maximum, and an a value that is less than 4. This STA is referred to below as an "identified" STA. For example, AP 110 may utilize the following formulas:

$$\text{proc\_extn}_u > \max_{\substack{\forall k \\ k \neq u}} \text{proc\_extn}_k$$

$$N_{sym,u} < N_{sym,init}$$

$$a_u < 4$$

Next, process 1000 entails reducing the number of symbols for the identified STA by one and setting the STA's a value to 3, unless an additional short symbol is required, then set the STA's a value to 4. This process will be performed for each of the identified STAs. For example:

$$N_{sym,u} = N_{sym} - 1; \ a_u = 3$$

If LDPC extra short symbol is required for that STA (or any other STA): $a_u = 4$ Next, process 1000 entails applying pre-FEC padding for all STAs until the data fills the total number of the maximum number of symbols ($N_{sym,\ init}$), up until the boundary identified by the maximum a value ($a_{init}$). At this point, the length of each of the data packets including the padding can be the same. However, for identified STAs, a different padding may be used. In some aspects, pre-FEC padding is applied until the boundary indicated by the STA's own a value ($a_u$), and post-FEC padding is applied for the last symbol.

Next, process 1000 entails determining whether any STA requires an additional short symbol. In some aspects, a device may require an additional short symbol due to LDPC encoding. In one aspect, a short symbol corresponds to one fourth of the length of the symbol. In accordance with this aspect, the maximum a value and the maximum number of symbols required may be altered. For example, if the maximum a value is less than 4, then the value of 1 is added thereto. However, if the maximum a value is 4, then the value thereof is changed to 1, and the value of 1 is added to the maximum number of symbols required. For example:

If ($a_{init} < 4$); $a = a_{init} + 1$; $N_{sym} = N_{sym,\ init}$
If ($a_{init} = 4$); $a = 1$; $N_{sym} = N_{sym,\ init} + 1$ If the maximum number of symbols increases by 1 (as shown in the above example), then the LDPC encoding process is repeated taking the extra symbol and the new a value into account. Pre-FEC padding is applied to each STA in accordance with the new a value. For some STAs (identified earlier as satisfying the conditions) the number of symbols is increased but the a value does not change.

Next, process 1000 entails determining SE for each STA based on each STA's capability and the a value, similar to process 800 described above with reference to FIG. 8. AP 110 may utilize the a value of the particular wireless communications device 120, or may utilize the maximum a value for this purpose. AP 110 may perform this process for each of the wireless communications devices 120 receiving data in order to determine the maximum PE. However, for the identified STAs, a different determination may be made. In one aspect, the entire last symbol may be used as the SE for the device, and therefore no additional SE may be required. Therefore, AP 110 may rule the identified STAs out in making the determination of the maximum SE to apply. Next, process 1000 entails applying the maximum SE to the frame for all STAs. At this point, the transmission length for all of the STAs can be the same.

Next, process 1000 entails transmitting the a value, a SE disambiguation indication as described above with reference to FIG. 6, and additional short symbol indication that may indicate whether an additional short symbol was added based on the requirements of at least one of the wireless communications devices 120. In some aspects, the a value may be indicated by two bits, the SE disambiguation indication may be one bit, and the additional short symbol indication may be one bit (for a total of four bits). In one aspect, these bits may be provided in the header of the packet being transmitter, such as in an L-SIG or an HE-SIG of the packet header. It should be appreciated that additional steps may be present in process 1000, and that not all of the steps of process 1000 may be necessary.

Figure 11:
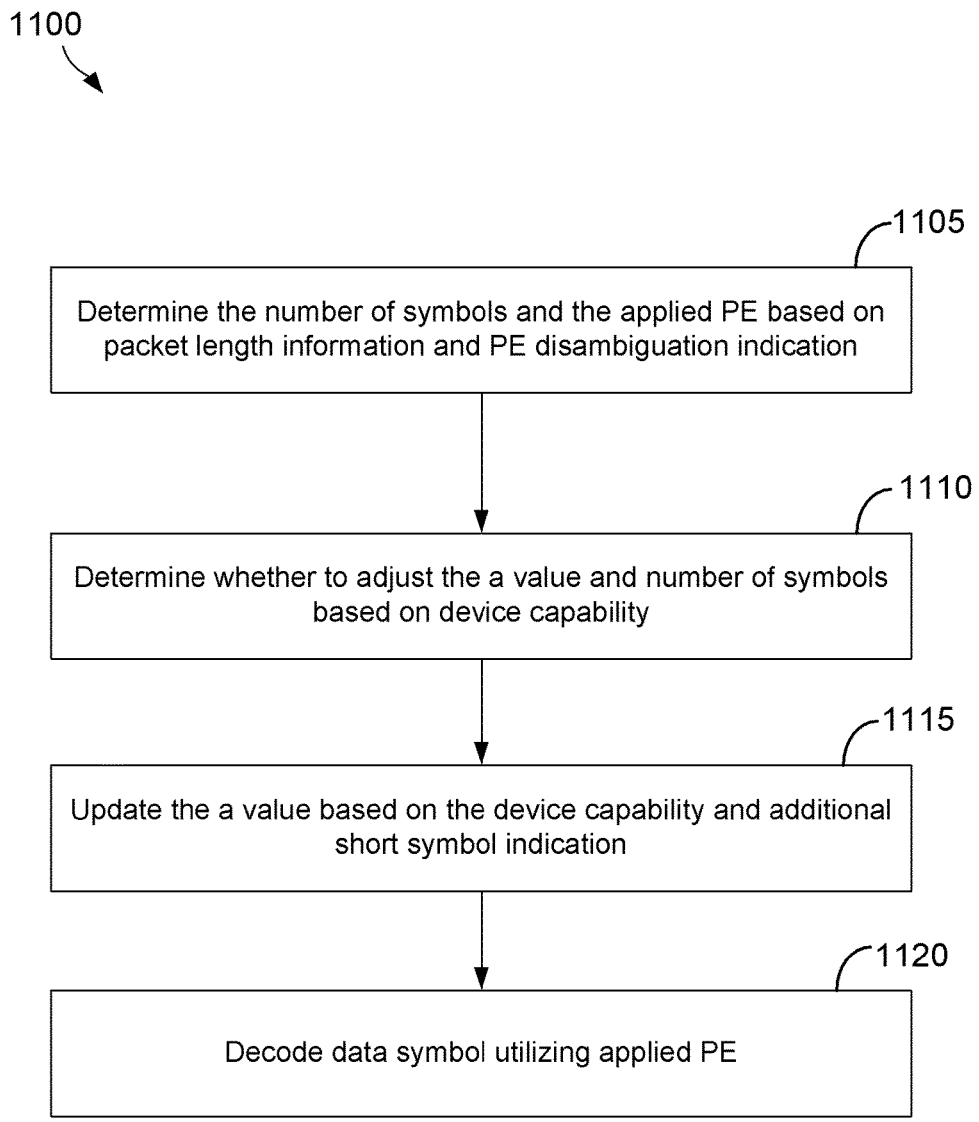
FIG. 11 is a flow chart of an aspect of an exemplary method of wireless communication.

FIG. 11 is a flow chart of an aspect of an exemplary process 1100 of wireless communication. In some aspects, process 1100 discussed below with respect to FIG. 11 may be performed by the device 302. For example, instructions in the memory 306 may configure the processor 304 to perform one or more of the functions discussed below with respect to process 1100.

In some aspects, process 1100 may be utilized by a wireless communications device 120 to receive data with SE from an AP 110.

Block 1105 determines a number of symbols and an applied SE based on packet length information and a SE disambiguation indication. As described above, this information may be indicated in the header of a packet received by a device performing process 1100. For example, this information may be in a packet that the wireless communications device 120 is receiving.

Block 1110 determines whether to adjust the determined a value and the number of symbols based on a device capability. For example, in one aspect, a receiving device may determine whether the applied SE is less than an amount of SE required for the receiving device based on the a value provided and a device capability indicated at association. Alternatively, an indication may be provided to each of the wireless communication devices 120 that satisfy this criteria, and each of the receiving devices would check this indication to determine whether it is one of the identified devices.

Block 1115 updates the a value based on the device capability and the additional short symbol indication. This updating may be the reverse of the process performed by the AP 110. For example, for devices not identified in the prior step, if the a value is greater than 1, then a value of 1 may be subtracted from the a value. However, if the a value is 1, then the a value may be set to 4, and the calculated number of symbols may be reduced by one. For example, if LDPC additional short symbol bit=1:

If a>1, then a=a-1 and $N_{sym}$ is unchanged
If a=1, then a=4; $N_{sym} = N_{sym} - 1$ However, for devices identified by the prior step, the devices may decrease or decrement the number of symbols by a value of 1, and if the additional short symbol indication is set to the value of 1, then set a equal to the value of 4, but if the additional short symbol indication is set to the value of 0, then set a equal to the value of 3.

Block 1120 decodes the data symbol utilizing the applied PE. For example, the data symbol may be decoded based on the PDPC decoding process, and the wireless communication device 120 may utilize the processing time provided by SE as a buffer to complete processing of the data transmission.

For certain bandwidths (BW), MCS, and number of spatial streams ($N_{SS}$), certain MCS may be "excluded." This MCS exclusion may be based, at least in part, on when a combination of the above yields values for $N_{CBPS,short}$ (number of coded bits per short symbol), $N_{DBPS,short}$ (number of data bits in a short symbol) or $N_{DBPS,Short}/N_{ES}$ (number of binary convolutional codes (BCC) encoders required) that are not integers. In one aspect, the following formulas may be used:

$$N_{CBPS,short} = N_{SD,short} * N_{SS} * N_{BPSCS}$$

$$N_{DBPS,short} = N_{CBPS,short} * R$$

Accordingly, in order to avoid MCS exclusion, all three of the parameters are required to be integers. In some aspects, the value of $N_{SD,short}$ should be such that it is one fourth of that of $N_{SD,long}$. In one aspect, the values identified in Table 2 below may be used.

TABLE 2

| BW | $N_{SD}$ | $N_{SD,Short}$ |
|---|---|---|
| 2.5 MHz | 24 | 6 |
| 5 MHz | 48 | 12 |
| 10 MHz | 102 | 24 |
| 20 MHz | 234 | 48 or 60 |
| 40 MHz | 468 | 120 |
| 80 MHz | 980 | 234 or 240 |

For example, in the 2.5 MHz BW, each boundary indicated by the a values 1-4 will be 6 tones apart. In other words, when data in the last symbol of a transmission is only within the first 6 tones, then a=1, when data in the last symbol of a transmission is outside of the first 6 tones but within the first 12 tones, then a=2, when data in the last symbol of a transmission is outside the first 12 tones but within the first 18 tones, then a=3, and when data in the last symbol of a transmission is outside of the first 18 tones but within the available 24 tones, then a=4. When the value of $N_{SD,short}$ is not exactly one fourth of $N_{SD}$ in Table 1, the first three boundaries indicated by the a values of 1, 2, and 3, will be $N_{SD}$ tones apart, and the remaining a value of 4 will correspond to the remaining balance of tones. For example, in the 40 MHz BW, when data in the last symbol of a transmission is only within the first 120 tones, then a=1, when data in the last symbol of a transmission is outside of the first 120 tones but within the first 240 tones, then a=2, when data in the last symbol of a transmission is outside the first 240 tones but within the first 360 tones, then a=3, and when data in the last symbol of a transmission is outside of the first 360 tones but within the available 468 tones, then a=4. Although $N_{SD}$ is listed as 120 for the BW of 40 MHz, 114 tones may be alternatively used. However, this alternative choice may not satisfy 1024 QAM with a code rate of ⅞.

Figure 12:
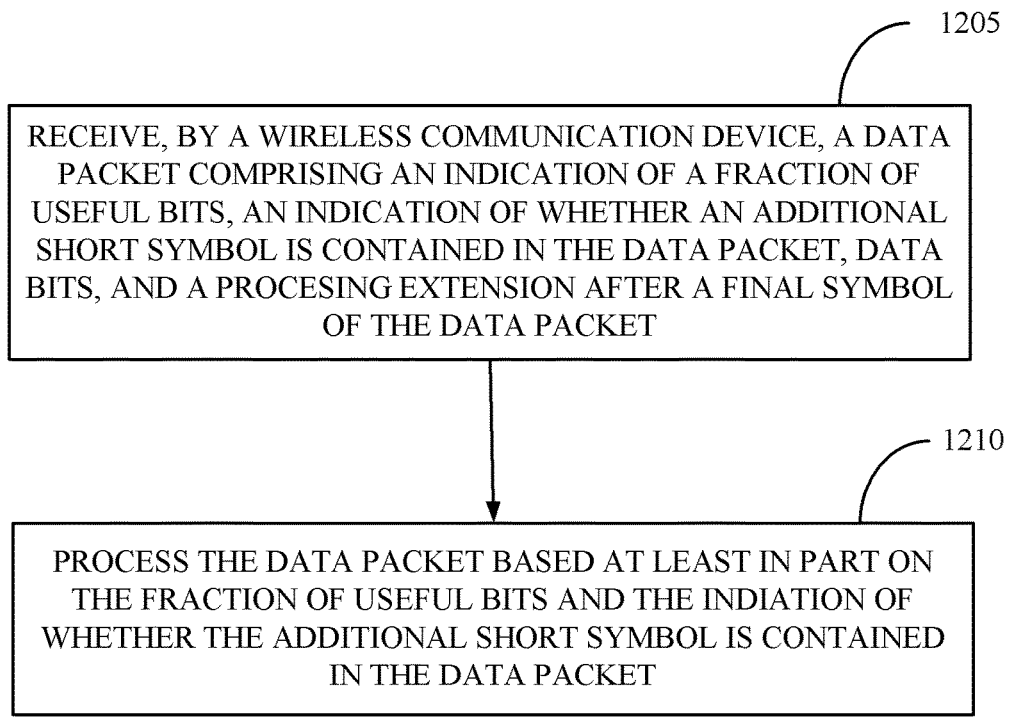
FIG. 12 is a flow chart of an aspect of an exemplary method of wireless communication.

FIG. 12 is a flowchart of a method of receiving a data packet of the format disclosed here. In some aspects, process 1200 may be performed by the wireless device 302. For example, in some aspects, the receiver 312 may be configured to receive the packet and the processor 304 may be configured to decode the packet as described above. In some aspects, the reception of the packet may be controlled by the processor 304. For example, the processor 304 may indicate to the receiver that it should configure itself to receive a packet, and then may copy data from the receiver 312 to the memory 306 after the packet has been received.

In block 1205, a data packet is received. The data packet includes an indication of a fraction of useful data bits, and the data bits. In some aspects, the data packet may include an indication of whether an additional short symbol is contained in the data packet, and/or a signaling extension after a final symbol of the data packet.

In block 1210, the data packet is processed based at least in part on the fraction of useful bits. In some aspects, processing the data packet may include decoding the data packet based on one or more of the indications in the data packet. In some aspects, the data packet may be processed based on the indication of whether the additional short symbol is contained in the data packet. For example, in some aspects, the data bits may be extracted from the packet based on the useful data bits indication. For example, the indicated useful bits may be copied to a buffer and processed based on a predetermined packet format. For example, in some aspects, a frame check sequence may be extracted from the end of the packet based on the number of useful bits indication. The frame check sequence may then be used to verify an integrity of the packet.

In some embodiments an apparatus for wireless communication may perform any of the processes 800-1100 described in FIGS. 8-11. In an exemplary embodiment, the apparatus for wireless communication is similar to the wireless communication device 302 of FIG. 3. In some embodiments, the apparatus comprises means for generating a first message requesting channel state information from one or more wireless communication devices. The generated first message may comprise a header and a payload. The header of the first message may comprise a plurality of fields of a first field type which are useable to determine the requested channel state information, and the payload of the first message may comprise channel state information parameters. The apparatus may further comprise means for transmitting the first message to the one or more wireless communication devices.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

As used herein, a phrase referring to "at least one of" a list of items refers to any combination of those items, including single members. As an example, "at least one of: A, B or C" is intended to cover A or B or C or A and B or A and C or B and C or A, B and C or 2A or 2B or 2C and so on.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

As used herein, the term interface may refer to hardware or software configured to connect two or more devices together. For example, an interface may be a part of a processor or a bus and may be configured to allow communication of information or data between the devices. The interface may be integrated into a chip or other device. For example, in some aspects, an interface may comprise a receiver configured to receive information or communications from a device at another device. The interface (e.g., of a processor or a bus) may receive information or data processed by a front end or another device or may process information received. In some aspects, an interface may comprise a transmitter configured to transmit or communicate information or data to another device. Thus, the interface may transmit information or data or may prepare information or data for outputting for transmission (e.g., via a bus).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. A method of extending a first message in a wireless communication network, comprising:
   determining a modulation and coding scheme capability of a destination device of the first message;
   determining a number of bits in a final symbol of the first message;
   determining a length of an extension based on the modulation and coding scheme capability and the number of bits; and
   transmitting the first message with an extension of the determined length to the destination device.

2. The method of claim 1, further comprising transmitting a second message with a second extension of a different length to a second destination device simultaneously with the transmission of the first message.

3. The method of claim 1, wherein the length of the extension is one of 0 µs, 4 µs, 8 µs, 12 µs or 16 µs.

4. The method of claim 2, further comprising padding the first message and the second message based on a maximum number of bits in final symbols of the first message and the second message.

5. The method of claim 1, further comprising:
   determining a difference between a duration of the final symbol and the length of the extension; and
   indicating a processing extension disambiguation indication in the first message based on the difference.

6. The method of claim 1, further comprising determining whether the first message is encoded using low density parity check (LDPC); and
   adding a symbol to the first message in response to the first message being encoded using low density parity check.

7. A method for receiving a first message including an extension in a wireless communication network, comprising:

receiving, by a wireless communication device, a packet comprising a first indication of a number of bits in a final symbol of the packet, a second indication of whether an additional symbol is contained in the packet, and a signaling extension after the final symbol of the packet;

receiving, by the wireless communication device, a packet length indication and a signaling extension disambiguation indication in the packet;

determining a number of symbols over which the packet is transmitted based at least in part on the packet length indication and the signaling extension disambiguation indication; and processing the packet, based at least in part on the number of symbols, the number of bits, and the second indication of whether the additional symbol is contained in the packet.

8. An apparatus for extending a first message in a wireless communication network, the apparatus comprising:

an electronic hardware processor configured to:
determine a modulation and coding scheme capability of a destination device of the first message,
determine a number of bits in a final symbol of the first message,
determine a length of an extension based on the modulation and coding scheme capability and the number of bits; and a transmitter configured to transmit the first message with an extension of the determined length to the destination device.

9. The apparatus of claim 8, wherein the electronic hardware processor is further configured to transmit a second message with a second extension of a different length to a second destination device simultaneously with the transmission of the first message.

10. The apparatus of claim 8, wherein the length of the extension is one of 0 μs, 4 μs, 8 μs, 12 μs or 16 μs.

11. The apparatus of claim 9, wherein the electronic hardware processor is further configured to pad the first message and the second message based on a maximum number of bits in final symbols of the first message and the second message.

12. The apparatus of claim 8, wherein the electronic hardware processor is further configured to:
determine a difference between a duration of the final symbol and the extension length, and
indicate a processing extension disambiguation indication in the first message based on the difference.

13. The apparatus of claim 8, wherein the electronic hardware processor is further configured to:
determine whether the first message is encoded using low density parity check (LDPC); and
add a symbol to the first message in response to the first message being encoded using low density parity check.

14. An apparatus for receiving a first message including an extension in a wireless communication network, comprising:

a receiver configured to:
receive a data packet comprising a first indication of a number of bits in a final symbol of the data packet, a second indication of whether an additional symbol is contained in the data packet, and a signaling extension after the final symbol of the data packet, and
receive a packet length indication and a signaling extension disambiguation indication in the packet; and an electronic hardware processor configured to:
determine a number of symbols over which the packet is transmitted based at least in part on the packet length indication and the signaling extension disambiguation indication, and
process the data packet, based at least in part on the number of symbols, the number of bits, and the second indication of whether the additional symbol is contained in the data packet.

15. A non-transitory computer readable medium comprising instructions that when executed cause a processor to perform a method of extending a first message in a wireless communication network, the method comprising:
determining a modulation and coding scheme capability of a destination device of the first message;
determining a number of bits in a final symbol of the first message;
determining a length of an extension based on the modulation and coding scheme capability and the number of bits; and
transmitting the first message with an extension of the determined length to the destination device.

16. The non-transitory computer readable medium of claim 15, wherein the instructions further provide for transmitting a second message with a second extension of a different length to a second destination device simultaneously with the transmission of the first message.

17. The non-transitory computer readable medium of claim 16, wherein the instructions further provide for padding the first message and the second message based on a maximum number of bits in final symbols of the first message and the second message.

18. The non-transitory computer readable medium of claim 15, wherein the instructions further provide for:
determining a difference between a duration of the final symbol and the extension length; and
indicating a processing extension disambiguation indication in the first message based on the difference.

19. The non-transitory computer readable medium of claim 15, wherein the instructions further provide for:
determining whether the first message is encoded using low density parity check (LDPC); and
adding a symbol to the first message in response to the first message being encoded using low density parity check.

20. A method of wireless communication in a wireless communication network, the method comprising:
receiving, by a wireless communication device, a data packet comprising an indication of a number of bits in a final symbol of the data packet, an indication of whether an additional symbol is contained in the data packet, and a signaling extension after the final symbol of the data packet;
receiving, by the wireless communication device, a packet length indication and a signaling extension disambiguation indication in the data packet;
determining a number of symbols over which the data packet is transmitted based at least in part on the packet length indication and the signaling extension disambiguation indication; and
processing, by the wireless communication device, the data packet based at least in part on the number of symbols, the number of bits and the indication of whether the additional symbol is contained in the data packet.

21. An apparatus for wireless communication in a wireless communication network, the apparatus comprising:

a receiver configured to:
   receive a data packet comprising a first indication of a number of bits in a final symbol of the data packet, a second indication of whether an additional symbol is contained in the data packet, and a signaling extension after the final symbol of the data packet, and
   receive a packet length indication and a signaling extension disambiguation indication in the data packet; and an electronic hardware processor configured to:
   determine a number of symbols over which the data packet is transmitted based at least in part on the packet length indication and the signaling extension disambiguation indication, and
   decode the data packet based at least in part on the number of symbols, the number of bits and the second indication of whether the additional symbol is contained in the data packet.

\* \* \* \* \*